(12) United States Patent
Kim

(10) Patent No.: US 10,088,039 B2
(45) Date of Patent: Oct. 2, 2018

(54) VEHICLE SHIFT CONTROL LEVER DEVICE

(71) Applicant: KYUNG CHANG INDUSTRIAL CO., Ltd., Daegu (KR)

(72) Inventor: Dong Won Kim, Daegu (KR)

(73) Assignee: KYUNG CHANG INDUSTRIAL CO., LTD. (KR)

( * ) Notice: Subject to any disclaimer, the term of this patent is extended or adjusted under 35 U.S.C. 154(b) by 432 days.

(21) Appl. No.: 14/663,712

(22) Filed: Mar. 20, 2015

(65) Prior Publication Data

US 2015/0267806 A1 Sep. 24, 2015

(30) Foreign Application Priority Data

Mar. 20, 2014 (KR) .................. 10-2014-0032533

(51) Int. Cl.

| *F16H 61/22* | (2006.01) |
|---|---|
| *F16H 59/02* | (2006.01) |
| *F16H 59/10* | (2006.01) |
| *F16H 63/42* | (2006.01) |

(Continued)

(52) U.S. Cl.
CPC .......... *F16H 61/22* (2013.01); *F16H 59/0204* (2013.01); *F16H 59/0278* (2013.01); *F16H 59/105* (2013.01); *F16H 63/42* (2013.01); F16H 59/44 (2013.01); F16H 59/54 (2013.01); F16H 2059/0282 (2013.01); F16H 2063/423 (2013.01); Y10T 74/20085 (2015.01); Y10T 74/20098 (2015.01)

(58) Field of Classification Search
CPC ...... F16H 63/42; F16H 63/38; F16H 59/0278; F16H 59/02; F16H 2059/026; F16H 59/0204

See application file for complete search history.

(56) References Cited

U.S. PATENT DOCUMENTS

| 2010/0071506 A1* | 3/2010 | Kliemannel ........ F16H 59/0204 74/625 |
|---|---|---|
| 2011/0197697 A1* | 8/2011 | Morrissett ............. B60K 20/02 74/473.24 |

(Continued)

FOREIGN PATENT DOCUMENTS

| CN | 101680536 | 3/2010 |
|---|---|---|
| CN | 101825167 | 9/2010 |

(Continued)

OTHER PUBLICATIONS

Machine translation of KR 101341128.*

(Continued)

*Primary Examiner* — David Morgan Fenstermacher
(74) *Attorney, Agent, or Firm* — The Belles Group, P.C.

(57) ABSTRACT

A vehicle shift control lever device may be provided that includes: a transmission rod; a detent pin which is disposed under the transmission rod in such a manner as to move in up-and-down and back-and-forth directions; and a groove member which has a groove formed therein which guides the detent pin. The groove member includes a first stable position "a" at which the detent pin is placed when a shift position is R, D, M or N-shift positions and a second stable position "b" at which the detent pin is placed when the shift position is a P-shift position.

11 Claims, 37 Drawing Sheets

(51) Int. Cl.
　　　*F16H 59/44*　　　(2006.01)
　　　*F16H 59/54*　　　(2006.01)

(56) References Cited

U.S. PATENT DOCUMENTS

| | | | | |
|---|---|---|---|---|
| 2012/0231927 A1* | 9/2012 | Beechie | ................ | B60W 50/14 |
| | | | | 477/99 |
| 2014/0000403 A1* | 1/2014 | Kim | ........................ | F16H 61/22 |
| | | | | 74/473.21 |
| 2014/0055257 A1* | 2/2014 | Liu | ........................ | B60Q 1/00 |
| | | | | 340/456 |

FOREIGN PATENT DOCUMENTS

| | | | | |
|---|---|---|---|---|
| JP | 2007168780 | 7/2007 | | |
| KR | 198613 | 7/2000 | | |
| KR | 1341128 | 12/2013 | | |
| KR | 101341128 B1 * | 12/2013 | ........... | F16H 59/105 |
| KR | 101341128 B1 * | 12/2013 | ........... | F16H 59/105 |

OTHER PUBLICATIONS

Corresponding Office Action issued by the SIPO dated Oct. 28, 2016.
Corresponding Office Action issued by the KIPO dated Feb. 13, 2015.
Corresponding Office Action issued by the KIPO dated Jun. 12, 2015.

* cited by examiner

Fig.28

| CURRENT SHIFT POSITION | Brake | Unlock Button | WHETHER DRIVING OR NOT | PIVOTING DIRECTION | PIVOTABLE OR NOT | POSITION OF FIRST FIXING PIN | POSITION OF SECOND FIXING PIN |
|---|---|---|---|---|---|---|---|
| P | OFF | OFF | STATIONARY STATE | V < | NOT ALLOWED | 5 | 4 |
| P | ON | OFF | STATIONARY STATE | V < | NOT ALLOWED | 5 | 4 |
| P | OFF | ON | STATIONARY STATE | V < | NOT ALLOWED | 5 | 4 |
| P | ON | ON | STATIONARY STATE | V < | ALLOWED | 5 | 3 |
|  |  |  |  | V < ∧ | NOT ALLOWED |  |  |
|  |  |  |  | V < ∧ ∧ | NOT ALLOWED |  |  |
|  |  |  |  | V < V | ALLOWED |  |  |
|  |  |  |  | V < V V | ALLOWED |  |  |
|  |  |  |  | V < < | NOT ALLOWED |  |  |

Fig.29

| CURRENT SHIFT POSITION | Brake | Unlock Button | WHETHER DRIVING OR NOT | PIVOTING DIRECTION | PIVOTABLE OR NOT | POSITION OF FIRST FIXING PIN | POSITION OF SECOND FIXING PIN |
|---|---|---|---|---|---|---|---|
| R | OFF | OFF | STATIONARY STATE OR SPEED LESS THAN 6 KM/H | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |
|   |   |   | DRIVING | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |
| R | ON | OFF | STATIONARY STATE OR SPEED LESS THAN 6 KM/H | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |
|   |   |   | DRIVING | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |
| R | OFF | ON | STATIONARY STATE OR SPEED LESS THAN 6 KM/H | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |
|   |   |   | DRIVING | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |
| R | ON | ON | STATIONARY STATE OR SPEED LESS THAN 6 KM/H | ∧∧ | NOT ALLOWED | 1 | 2 |
|   |   |   |   | > | NOT ALLOWED |   |   |
|   |   |   |   | < | ALLOWED |   |   |
|   |   |   |   | ∨∨ | ALLOWED |   |   |
|   |   |   |   | < | NOT ALLOWED |   |   |
|   |   |   |   | >∧ | ALLOWED |   |   |
|   |   |   | DRIVING | ∧∧ | NOT ALLOWED | 2 | 1 |
|   |   |   |   | > | NOT ALLOWED |   |   |
|   |   |   |   | < | ALLOWED |   |   |
|   |   |   |   | ∨∨ | NOT ALLOWED |   |   |
|   |   |   |   | < | NOT ALLOWED |   |   |
|   |   |   |   | >∧ | NOT ALLOWED |   |   |

Fig.30a

| CURRENT SHIFT POSITION | Brake | Unlock Button | WHETHER DRIVING OR NOT | PIVOTING DIRECTION | PIVOTABLE OR NOT | POSITION OF FIRST FIXING PIN | POSITION OF SECOND FIXING PIN |
|---|---|---|---|---|---|---|---|
| N | OFF | OFF | STATIONARY STATE OR SPEED LESS THAN 6 KM/H | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | FORWARD DRIVING | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | BACKWARD DRIVING | ∧∧ | NOT ALLOWED | 2 PREVENT SHIFT POSITION FROM BEING CHANGED TO D-SHIFT POSITION BY SOFTWARE | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| N | ON | OFF | STATIONARY STATE OR SPEED LESS THAN 6 KM/H | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | FORWARD DRIVING | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | BACKWARD DRIVING | ∧∧ | NOT ALLOWED | 2 PREVENT SHIFT POSITION FROM BEING CHANGED TO D-SHIFT POSITION BY SOFTWARE | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |

Fig.30b

| CURRENT SHIFT POSITION | Brake | Unlock Button | WHETHER DRIVING OR NOT | PIVOTING DIRECTION | PIVOTABLE OR NOT | POSITION OF FIRST FIXING PIN | POSITION OF SECOND FIXING PIN |
|---|---|---|---|---|---|---|---|
| N | OFF | ON | STATIONARY STATE OR SPEED LESS THAN 6 KM/H | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | FORWARD DRIVING | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | BACKWARD DRIVING | ∧∧ | NOT ALLOWED | 2 PREVENT SHIFT POSITION FROM BEING CHANGED TO D-SHIFT POSITION BY SOFTWARE | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| N | ON | ON | STATIONARY STATE OR SPEED LESS THAN 6 KM/H | ∧∧ | NOT ALLOWED | 3 | 2 |
| | | | | ∧ | ALLOWED | | |
| | | | | ∨ | ALLOWED | | |
| | | | | ∨∨ | NOT ALLOWED | | |
| | | | | < | NOT ALLOWED | | |
| | | | | >∧ | ALLOWED | | |
| | | | FORWARD DRIVING SPEED GREATER THAN 6 KM/H | ∧∧ | NOT ALLOWED | 2 | 1 |
| | | | | ∧ | NOT ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |
| | | | BACKWARD DRIVING SPEED GREATER THAN 6 KM/H | ∧∧ | NOT ALLOWED | 3 PREVENT SHIFT POSITION FROM BEING CHANGED TO D-SHIFT POSITION BY SOFTWARE | 1 |
| | | | | ∧ | ALLOWED | | |
| | | | | ∨ | ALLOWED | | |
| | | | | ∨∨ | NOT ALLOWED | | |
| | | | | < | NOT ALLOWED | | |
| | | | | >∧ | NOT ALLOWED | | |

Fig.31

| CURRENT SHIFT POSITION | Brake | Unlock Button | WHETHER DRIVING OR NOT | PIVOTING DIRECTION | PIVOTABLE OR NOT | POSITION OF FIRST FIXING PIN | POSITION OF SECOND FIXING PIN |
|---|---|---|---|---|---|---|---|
| D | OFF | OFF | STATIONARY STATE OR SPEED LESS THAN 6 KM/H | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |
| D | ON | OFF | STATIONARY STATE OR SPEED LESS THAN 6 KM/H | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |
| D | OFF | ON | STATIONARY STATE OR SPEED LESS THAN 6 KM/H | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |
| D | ON | ON | STATIONARY STATE OR SPEED LESS THAN 6 KM/H | ∧∧ | ALLOWED | 5 | 2 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | ALLOWED | | |
| | | | DRIVING | ∧∧ | NOT ALLOWED | 4 | 1 |
| | | | | ∧ | ALLOWED | | |
| | | | | v | NOT ALLOWED | | |
| | | | | vv | NOT ALLOWED | | |
| | | | | < | ALLOWED | | |
| | | | | >∧ | NOT ALLOWED | | |

Fig.32

| CURRENT SHIFT POSITION | Brake | Unlock Button | WHETHER DRIVING OR NOT | PIVOTING DIRECTION | PIVOTABLE OR NOT | POSITION OF FIRST FIXING PIN | POSITION OF SECOND FIXING PIN |
|---|---|---|---|---|---|---|---|
| M | OFF | OFF | STATIONARY STATE OR SPEED LESS THAN 6 KM/H | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| M | ON | OFF | STATIONARY STATE OR SPEED LESS THAN 6 KM/H | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| M | OFF | ON | STATIONARY STATE OR SPEED LESS THAN 6 KM/H | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| M | ON | ON | STATIONARY STATE OR SPEED LESS THAN 6 KM/H | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |
| | | | DRIVING | ∧∧ | NOT ALLOWED | 6 | 1 |
| | | | | ∧ | ALLOWED | | |
| | | | | v | ALLOWED | | |
| | | | | vv | NOT ALLOWED | | |
| | | | | < | ALLOWED | | |
| | | | | >∧ | NOT ALLOWED | | |

VEHICLE SHIFT CONTROL LEVER DEVICE

CROSS REFERENCE TO RELATED APPLICATIONS

Priority is claimed under 35 U.S.C. § 119 to Korean Patent Application No.: 10-2014-0032533, filed Mar. 20, 2014, the disclosure of which is incorporated herein by reference in its entirety.

FIELD OF THE INVENTION

The present invention relates to a vehicle shift control lever device.

BACKGROUND OF THE INVENTION

In a vehicle equipped with a transmission, a lever device is provided which is located beside a driver's seat of the vehicle and allows the driver to select a shift mode. The lever device includes an electronic shift control lever device which electronically transmits an operation signal of the lever to the transmission control device.

One of the conventional electronic shift control lever devices allows R, N and D shift positions to be selected by shifting the lever forward or backward, and allows an M-shift position to be selected by moving the lever in the right or left direction.

In such an electronic shift control lever device, since a P-position is immediately selected by pressing a separate button, the separate button may be pressed by carelessness during the operation. Further, since the electronic shift control lever device is implemented by software, it does not include a mechanically implemented shift lock device according to the shift position, so that the driver cannot feel safe during the operation of the level.

Therefore, research is required to develop a vehicle shift control lever device capable of mechanically implementing a shift lock device of the shift position by no use of a separate button for selecting the P-shift position.

SUMMARY OF THE INVENTION

One embodiment is a vehicle shift control lever device that includes: a transmission rod 600; a detent pin 30 which is disposed under the transmission rod in such a manner as to move in up-and-down and back-and-forth directions; and a groove member 40 which has a groove formed therein which guides the detent pin 30. The groove member 40 includes a first stable position "a" at which the detent pin 30 is placed when a shift position is R, D, M or N-shift positions and a second stable position "b" at which the detent pin 30 is placed when the shift position is a P-shift position.

The transmission rod 600 may include a shift direction rotation axis 610 and a selecting direction rotation axis 620. The vehicle shift control lever device may further include a single sensor 73 which detects a shift direction pivoting or select direction pivoting of the transmission rod.

The vehicle shift control lever device may further include: a housing 10; a plate 300 including a third rear catching surface 352; and a second fixing part 200 disposed within the housing 10. The second fixing part 200 is caught by the third rear catching surface 352, so that the detent pin 30 may be placed at the second stable position "b".

The plate 300 may include a plate recess 350 on which the third rear catching surface 352 is formed. The second fixing part 200 may include a second fixing pin 210 of which one end is inserted into the plate recess 350.

The vehicle shift control lever device may further include: a pressing portion 400; and a release button 500. The pressing portion 400 may move the second fixing pin 210 by satisfying a predetermined condition or by pressing the release button 500.

The predetermined condition may be that brake and unlock buttons are in an on-state and a speed of the vehicle is a safe shift possible speed.

After the transmission rod upper portion 670 is pivoted forward in a state where the transmission rod upper portion 670 of the transmission rod 600 has been pivoted in the right direction, when the predetermined condition is not satisfied, the second fixing pin 210 is caught by the third rear catching surface 352, so that the detent pin 30 may be placed at the second stable position "b".

The predetermined condition may be that brake and unlock buttons are in an on-state and a speed of the vehicle may be a safe shift possible speed.

The vehicle shift control lever device may further include a display 90 which displays a current shift position.

Another embodiment is a vehicle shift control lever device that includes: a housing 10; a transmission rod 600 including a first catching surface 650; and a first fixing part 100 disposed within the housing 10. The first fixing part 100 is caught by the first catching surface 650.

The first catching surface 650 may include a front catching surface 651 which restricts the forward pivoting of the transmission rod upper portion 670 of the transmission rod 600 and a first rear catching surface 652 which restricts the rearward pivoting of the transmission rod upper portion 670 of the transmission rod 600.

The first catching surface 650 may include a left catching surface 653 which restricts the left direction pivoting of the transmission rod upper portion 670 of the transmission rod 600.

The vehicle shift control lever device may further include a second fixing part 200 disposed within the housing 10. The transmission rod 600 may include a second catching surface 654. The second fixing part 200 may be caught by the second catching surface 654.

The second catching surface 654 may restrict the right direction pivoting of the transmission rod upper portion 670 of the transmission rod 600.

The transmission rod 600 may further include a spindle bearing 640 having a spindle bearing recess 642 formed therein. The first fixing part 100 may include a first fixing pin 110 of which one end is inserted into the spindle bearing recess 642, a first moving member 120 which is connected to the other end of the first fixing pin 110, and a driving member 140 which moves the first moving member 120 in up-and-down directions. The first catching surface 650 may be formed on the circumference of the spindle bearing recess 642.

The first fixing part 100 may further include a hall sensor 150 which detects the position of the first moving member 120.

The vehicle shift control lever device may further include a display 90 which displays a current shift position.

BRIEF DESCRIPTION OF THE DRAWINGS

FIG. 28 is a table which shows that the position of the first fixing pin 110 and the position of the second fixing pin 210 are determined at a P-shift position in accordance with a brake, an unlock button and whether driving or not, and shows whether the transmission rod 600 is pivotable or not in accordance with the pivoting direction thereof;

FIG. 29 is a table which shows that the position of the first fixing pin 110 and the position of the second fixing pin 210 are determined at an R-shift position in accordance with the brake, the unlock button and whether driving or not, and shows whether the transmission rod 600 is pivotable or not in accordance with the pivoting direction thereof;

FIGS. 30a and 30b are tables which shows that the position of the first fixing pin 110 and the position of the second fixing pin 210 are determined at an N-shift position in accordance with the brake, the unlock button and whether driving or not, and shows whether the transmission rod 600 is pivotable or not in accordance with the pivoting direction thereof;

FIG. 31 is a table which shows that the position of the first fixing pin 110 and the position of the second fixing pin 210 are determined at a D-shift position in accordance with the brake, the unlock button and whether driving or not, and shows whether the transmission rod 600 is pivotable or not in accordance with the pivoting direction thereof; and FIG. 32 is a table which shows that the position of the first fixing pin 110 and the position of the second fixing pin 210 are determined at an M-shift position in accordance with the brake, the unlock button and whether driving or not, and shows whether the transmission rod 600 is pivotable or not in accordance with the pivoting direction thereof.

DETAILED DESCRIPTION OF THE INVENTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Figure 1:
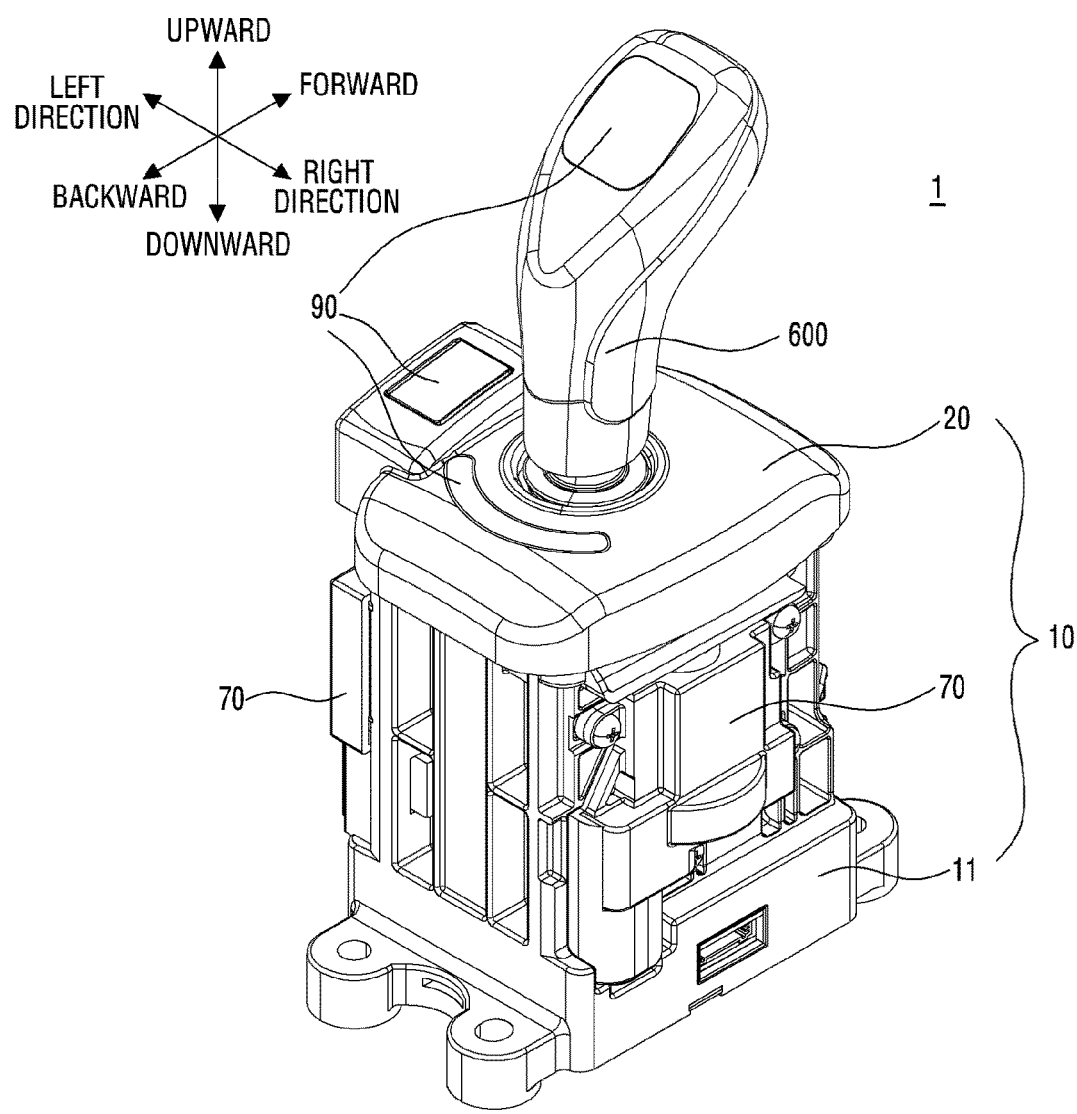
FIG. 1 is a perspective view of a vehicle shift control lever device 1 according to an embodiment of the present invention.
Figure 2:
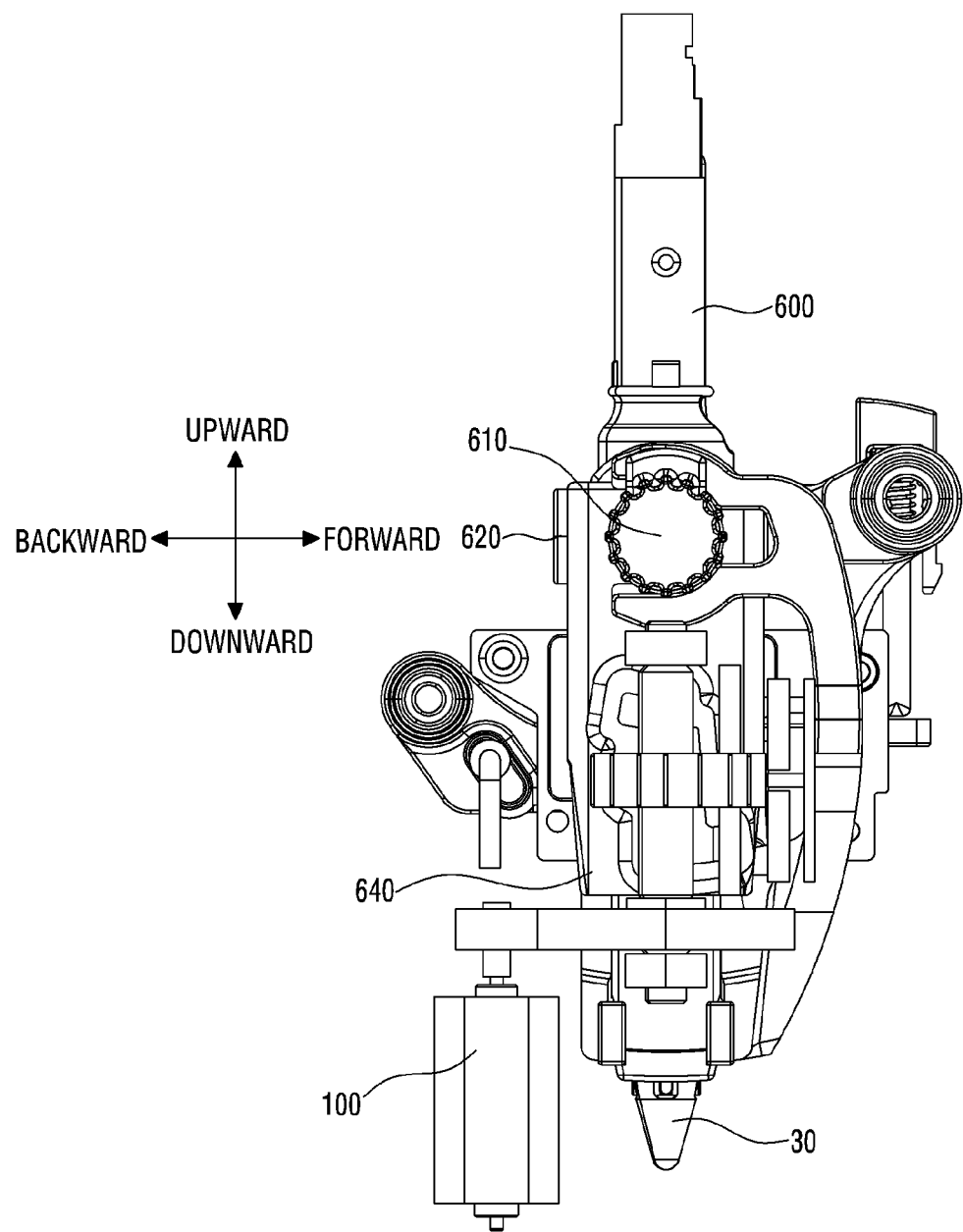
FIG. 2 is a right side view without external components for the purpose of showing an inner structure of the vehicle shift control lever device 1 shown in FIG. 1.
Figure 3:
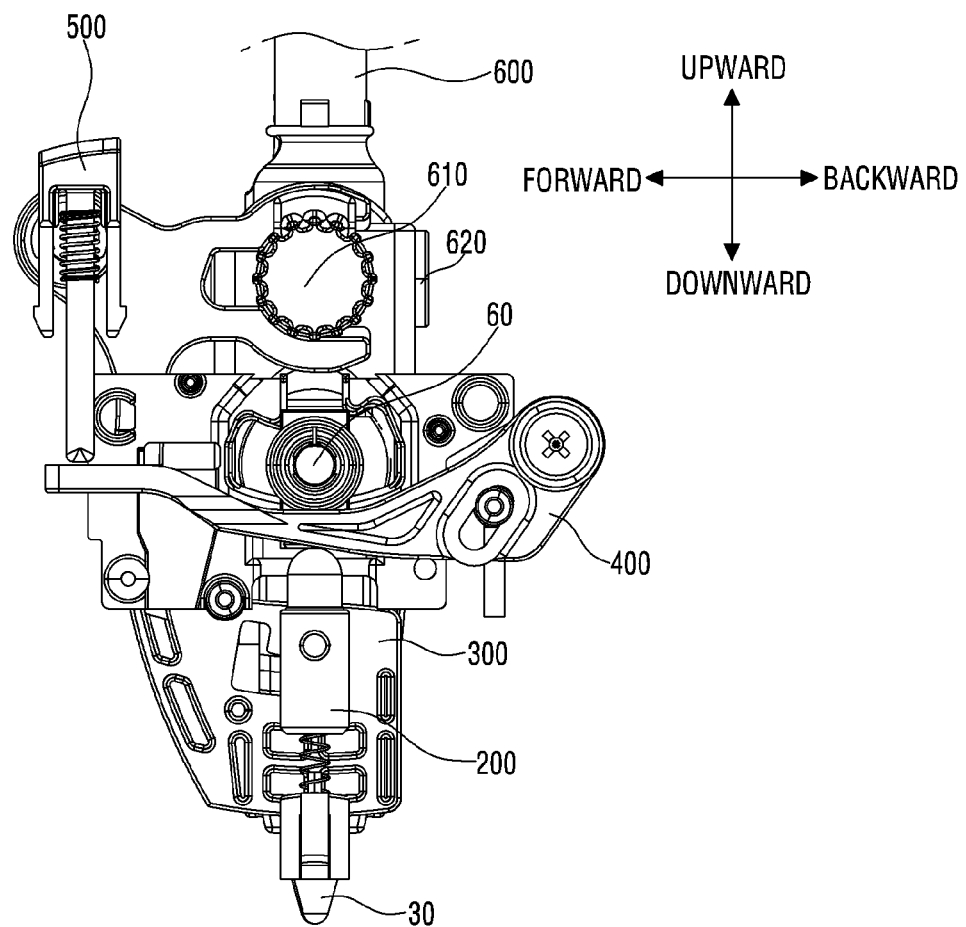
FIG. 3 is a left side view without external components for the purpose of showing an inner structure of the vehicle shift control lever device 1 shown in FIG. 1.

FIG. 1 is a perspective view of a vehicle shift control lever device 1 according to an embodiment of the present invention. FIG. 2 is a right side view without external components for the purpose of showing an inner structure of the vehicle shift control lever device 1 shown in FIG. 1. FIG. 3 is a left side view without external components for the purpose of showing an inner structure of the vehicle shift control lever device 1 shown in FIG. 1.

Figure 4:
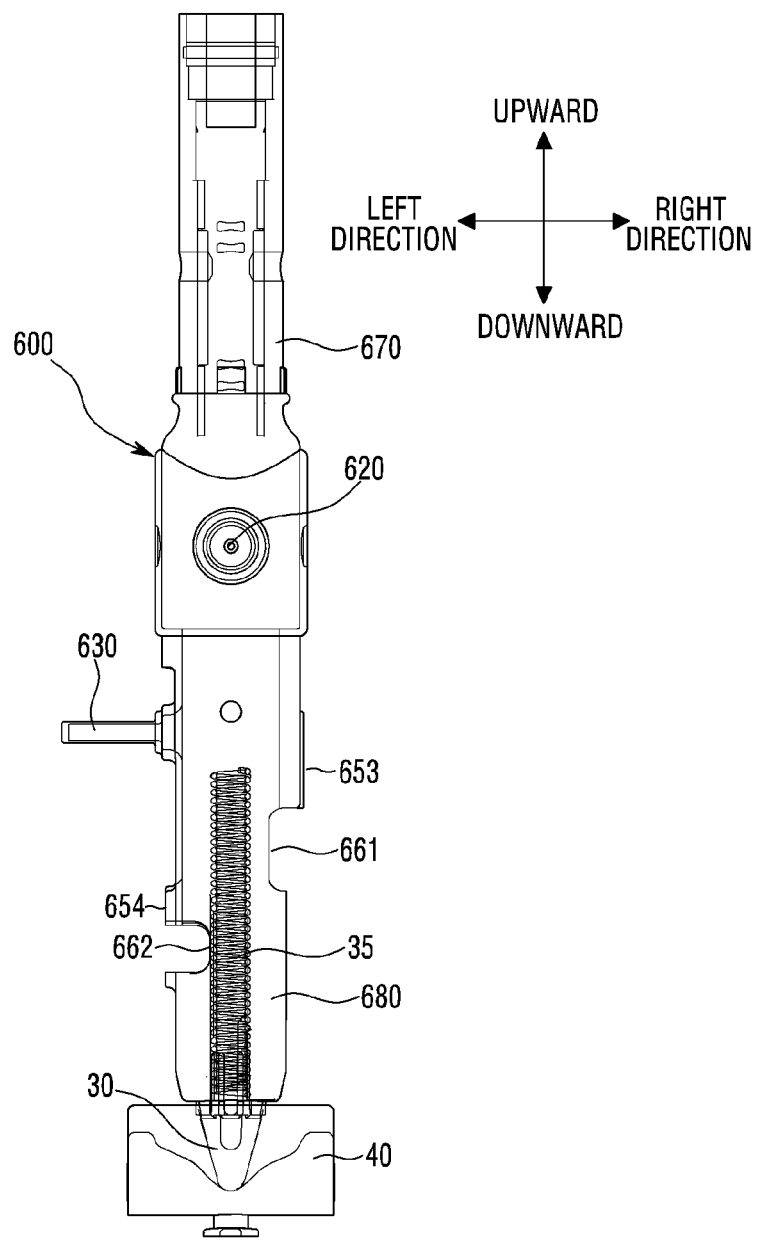
FIG. 4 is a rear partial cross sectional view of a transmission rod 600, a detent pin 30 and a groove member 40 shown in FIGS. 1 to 3.
Figure 5:
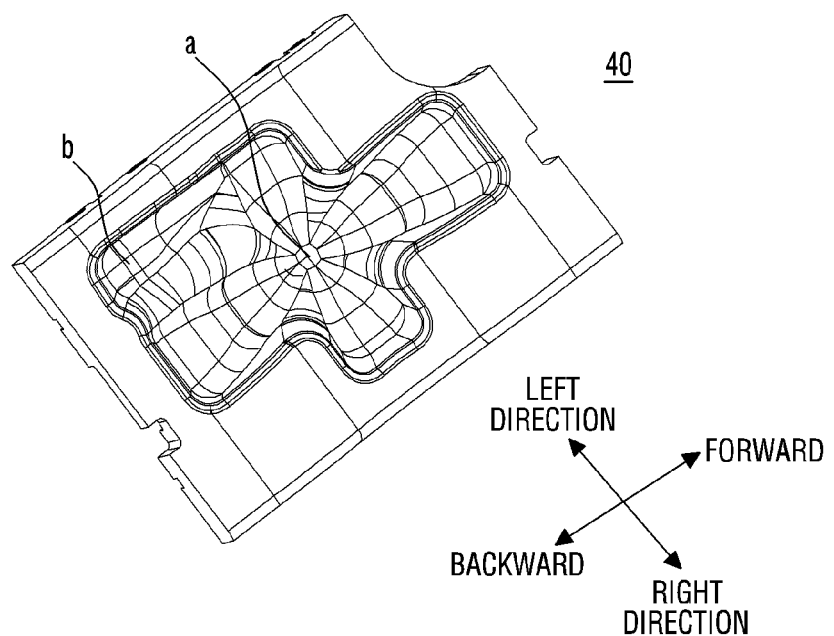
FIG. 5 is a top view of the groove member 40 shown in FIG. 4.

Also, FIG. 4 is a rear partial cross sectional view of a transmission rod 600, a detent pin 30 and a groove member 40 shown in FIGS. 1 to 3. FIG. 5 is a top view of the groove member 40 shown in FIG. 4.

Figure 6:
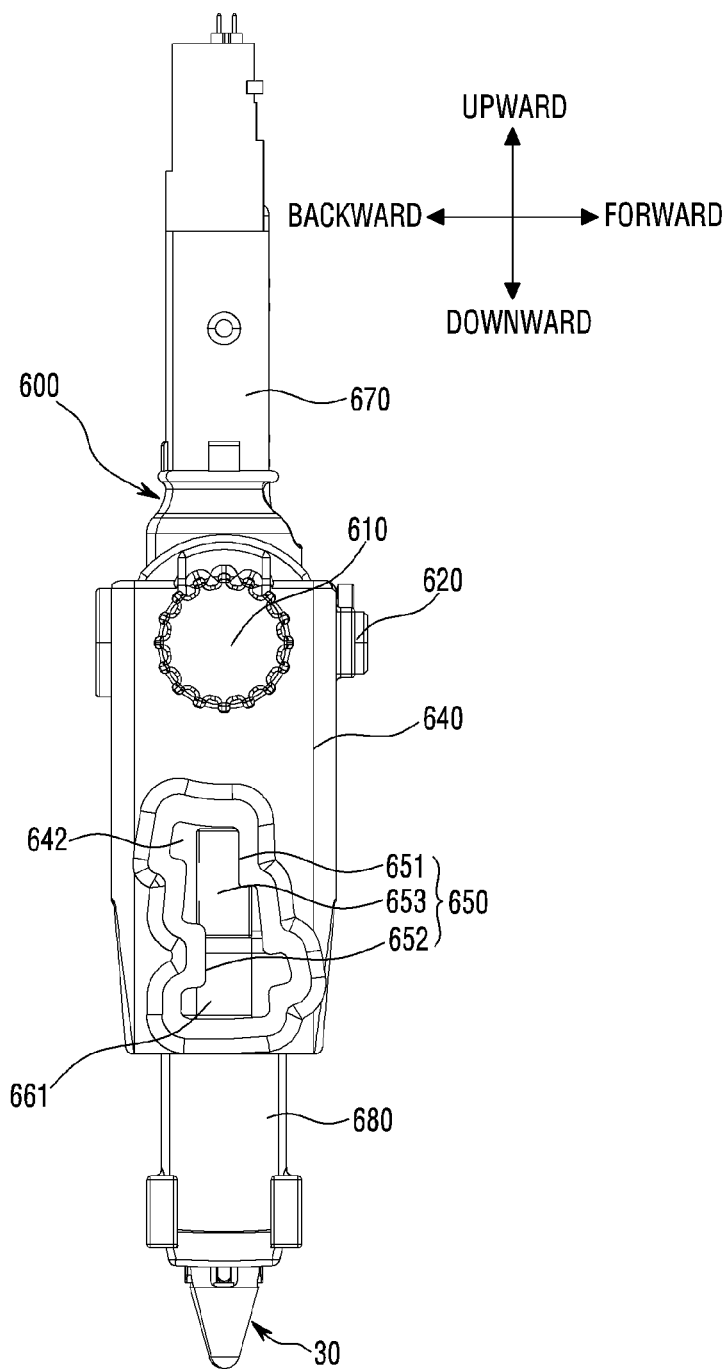
FIG. 6 is a right side view of the transmission rod 600 and the detent pin 30 shown in FIGS. 2 and 3.
Figure 7:
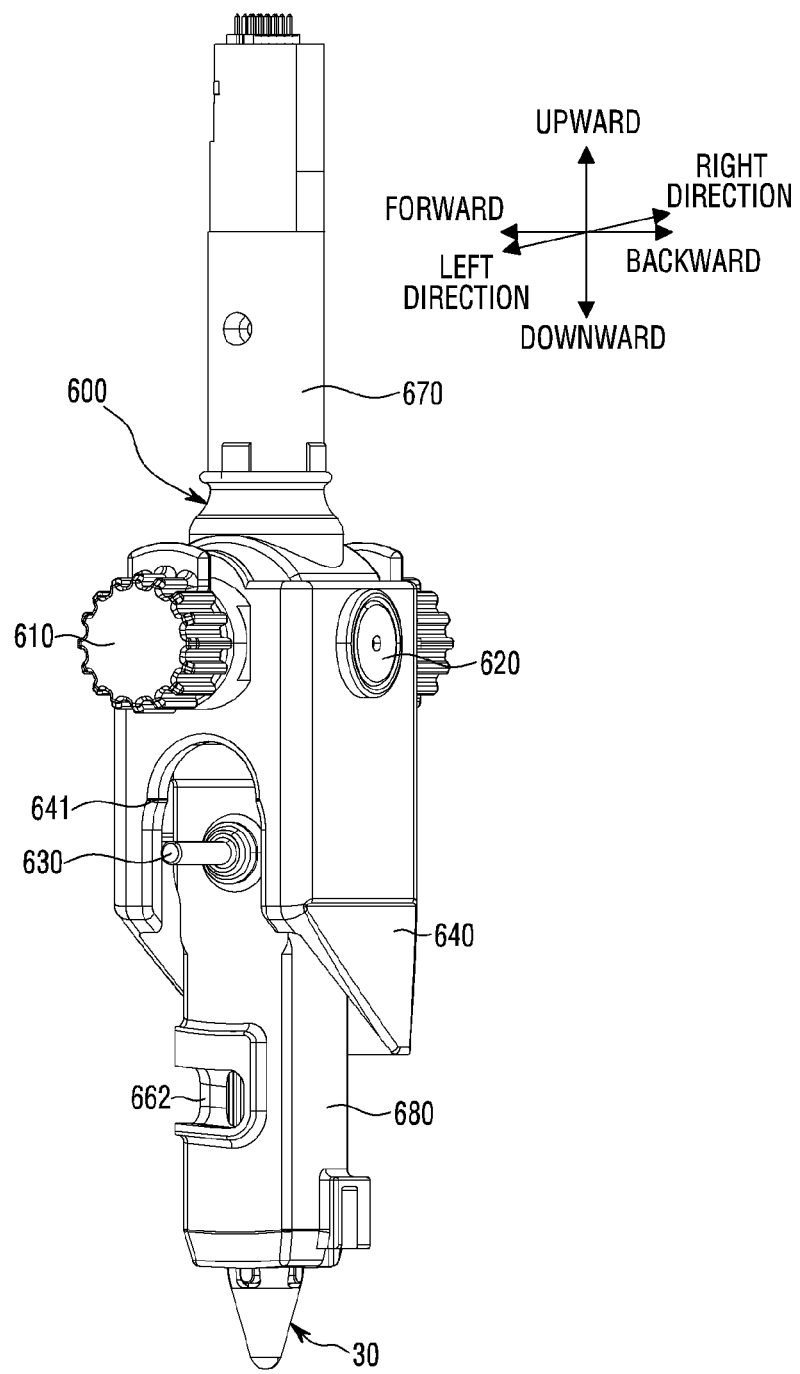
FIG. 7 is a left side view of the transmission rod 600 and the detent pin 30 shown in FIGS. 2 and 3.
Figure 8:
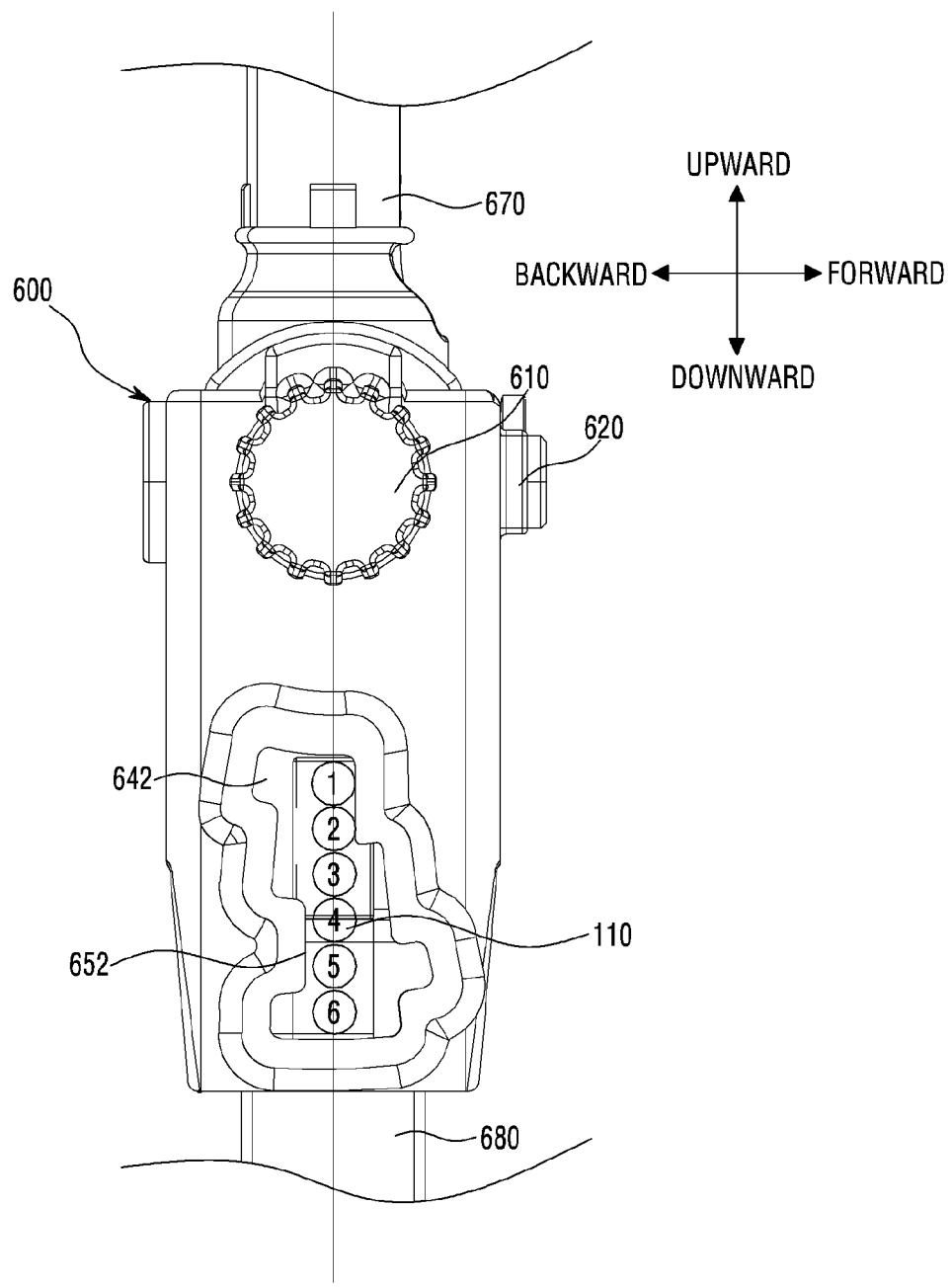
FIG. 8 is a right side view of the transmission rod 600 shown in FIG. 6.

Also, FIG. 6 is a right side view of the transmission rod 600 and the detent pin 30 shown in FIGS. 2 and 3. FIG. 7 is a left side view of the transmission rod 600 and the detent pin 30 shown in FIGS. 2 and 3. FIG. 8 is a right side view of the transmission rod 600 shown in FIG. 6. Here, the external components may be a housing 10.

Referring to FIGS. 1 to 8, the vehicle shift control lever device 1 according to the embodiment includes the housing 10, the transmission rod 600, the detent pin 30, and the groove member 40.

The housing 10 may receive the transmission rod 600, the detent pin 30, and the groove member 40, and may include a base bracket 11, a side cover 70, and an upper cover 20.

The base bracket 11 allows the vehicle shift control lever device 1 to be installed within the vehicle.

The side cover 70 is disposed on the base bracket 11. The side cover 70 surrounds the sides of the transmission rod 600, the detent pin 30, and the groove member 40.

The upper cover 20 is disposed on the side cover 70 and is formed to expose a below-described transmission rod upper portion 670 to the outside.

The transmission rod 600 may include a shift direction rotation axis 610, a select direction rotation axis 620, an extension part 630, and a spindle bearing 640.

The transmission rod 600 functions to select a shift position. The transmission rod 600 may pivot within a certain range in a shift direction (forward and backward directions of the vehicle) about the shift direction rotation axis 610 or in a select direction (left and right directions of the vehicle) about the select direction rotation axis 620.

The transmission rod 600 may include a transmission rod upper portion 670 located on the shift direction rotation axis 610 or the select direction rotation axis 620, and a transmission rod lower portion 680 located under the shift direction rotation axis 610 or the select direction rotation axis 620.

The transmission rod lower portion 680 may include the extension part 630 which extends from the left side thereof. The extension part 630 may be located within an opening 641 of the below-described spindle bearing 640.

The transmission rod lower portion 680 may include the spindle bearing 640. The opening 641 may be formed in the left side of the spindle bearing 640. A spindle bearing recess 642 may be formed in the right side of the spindle bearing 640.

A first recess 661 into which a first fixing pin 110 of a below-described first fixing part 100 is inserted and a first catching surface 650 by which the first fixing pin 110 of the first fixing part 100 is caught may be formed on the right side of the transmission rod lower portion 680. The first recess 661 may be positioned to be exposed to the outside through the spindle bearing recess 642. The first catching surface 650 may include a front catching surface 651, a first rear catching surface 652, and a left catching surface 653.

The first catching surface 650 may restrict the shift direction pivoting or select direction pivoting of the transmission rod 600 in accordance with the first to sixth positions of the first fixing pin 110.

Specifically, as shown in FIG. 8, the front catching surface 651 and the first rear catching surface 652 may be formed on the circumference of the spindle bearing recess 642 such that the shift direction pivoting of the transmission rod 600 is restricted in accordance with the first to sixth positions of the first fixing pin 110 of the below-described first fixing part 100.

Also, the left catching surface 653 may be formed on the right side of the transmission rod lower portion 680 such that the select direction pivoting of the transmission rod 600 is restricted in accordance with the first to sixth positions of the first fixing pin 110 of the first fixing part 100.

A second recess 662 into which a second fixing pin 210 of a below-described second fixing part 200 is inserted and a second catching surface 654 by which the second fixing pin 210 of the second fixing part 200 is caught may be formed on the left side of the transmission rod lower portion 680.

The second catching surface 654 may restrict the select direction pivoting of the transmission rod 600 in accordance with the first to fourth positions of the second fixing pin 210.

The detent pin 30 is disposed under the transmission rod 600 in such a manner as to move in up-and-down and back-and-forth directions by a detent pin elastic member 35. The lower portion of the detent pin 30 contacts the groove member 40 and is guided.

A groove which guides the detent pin 30 is formed on the top surface of the groove member 40. The groove guiding the detent pin 30 may have a concave shape.

A first stable position "a" is formed in the center of the groove of the groove member 40.

An inclined surface may be formed around the first stable position "a". The detent pin elastic member 35 may allow the detent pin 30 to return to the first stable position "a" along the inclined surface.

Also, a second stable position "b" formed on the left-rear of the first stable position "a" may be placed in the groove of the groove member 40.

Figure 9:
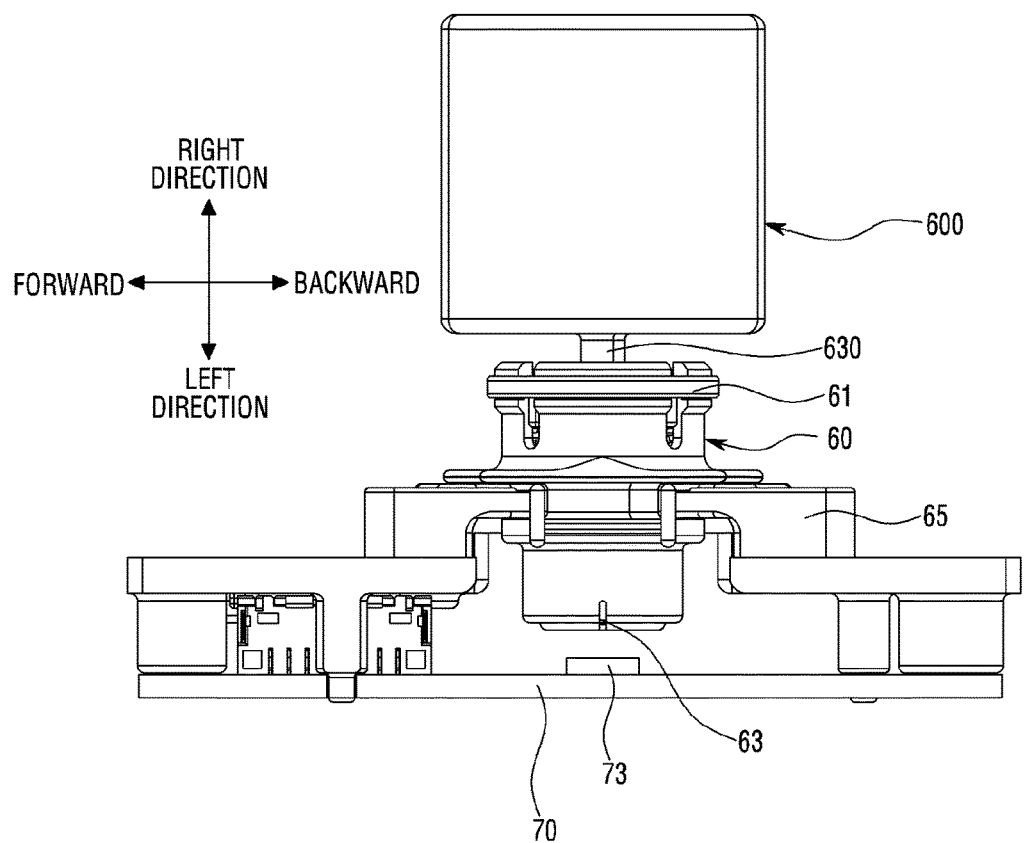
FIG. 9 is a top view of a guide 60 and a single sensor 73 of the vehicle shift control lever device 1 according to the embodiment.

FIG. 9 is a top view of a guide 60 and a single sensor 73 of the vehicle shift control lever device 1 according to the embodiment.

Referring to FIGS. 1, 3, 7 and 9, the vehicle shift control lever device 1 may further include the guide 60, a guide cover 65, and the single sensor 73. The guide 60 may include a connection portion 61 and a mover 63.

The connection portion 61 is disposed to surround the extension part 630 formed on the transmission rod 600.

The guide 60 moves in interworking with the shift direction pivoting and select direction pivoting of the transmission rod 600. Specifically, the guide 60 moves forward or backward in interworking with the shift direction pivoting of the transmission rod 600 and moves upward or downward in interworking with the select direction pivoting of the transmission rod 600.

The single sensor 73 which detects the movement of the mover 63 is inside the side cover 70 and is disposed in a position facing the mover 63. Here, the guide 60 has a fixed directivity by the recess formed in the guide cover 65. That is, the guide 60 moves in a fixed direction along the path of the recess formed in the guide cover 65. Therefore, since the mover 63 moves in the fixed direction, the position of the mover 63 can be easily detected by the single sensor 73.

The mover 63 may be a magnet or a conductor. Here, when the mover 63 is a magnet, the single sensor 73 may be a 2D hall sensor or a 3D hall sensor. Also, when the mover 63 is a conductor, the single sensor 73 may be an inductive sensor.

Referring to FIG. 1, the vehicle shift control lever device 1 may further include a display 90.

The display 90 displays a current shift position. The display 90 may be placed on the outer surface of the vehicle shift control lever device 1 so as to allow a driver to easily check the current shift position. For example, the display 90 may be placed on the outer surface of the upper cover 20 of the vehicle shift control lever device 1 and on the outer surface of the transmission rod upper portion 670.

The display 90 may display the current shift position in a visual way such as characters, colors or the like. For example, for the purpose of allowing the driver to easily check the current shift position, the current shift position can be displayed by using alphabets P, R, N, D, M, etc. Also, the current shift position can be displayed on a display means like a liquid crystal by using a variety of colors. Specifically, the display 90 may display the P, R, N, D, M-shift positions by white, red, green, yellow, blue colors respectively.

Here, though it has been described that the display 90 displays in a visual way, there is no limit to this. The display 90 is able to display in various known ways.

Figure 10A:
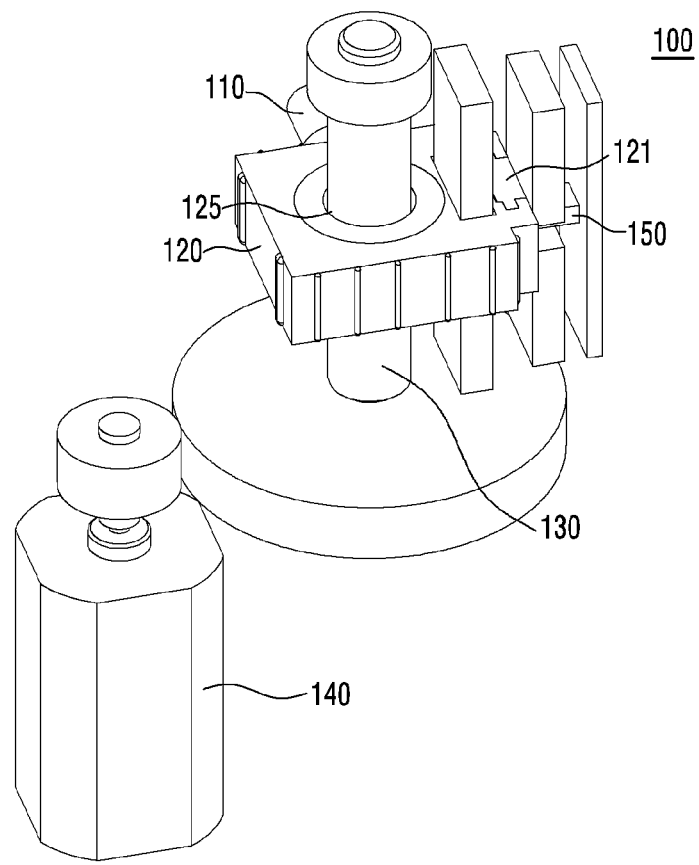
FIGS. 10a to 10c show a first fixing part 100 of the vehicle shift control lever device 1 according to the embodiment.
Figure 10B:
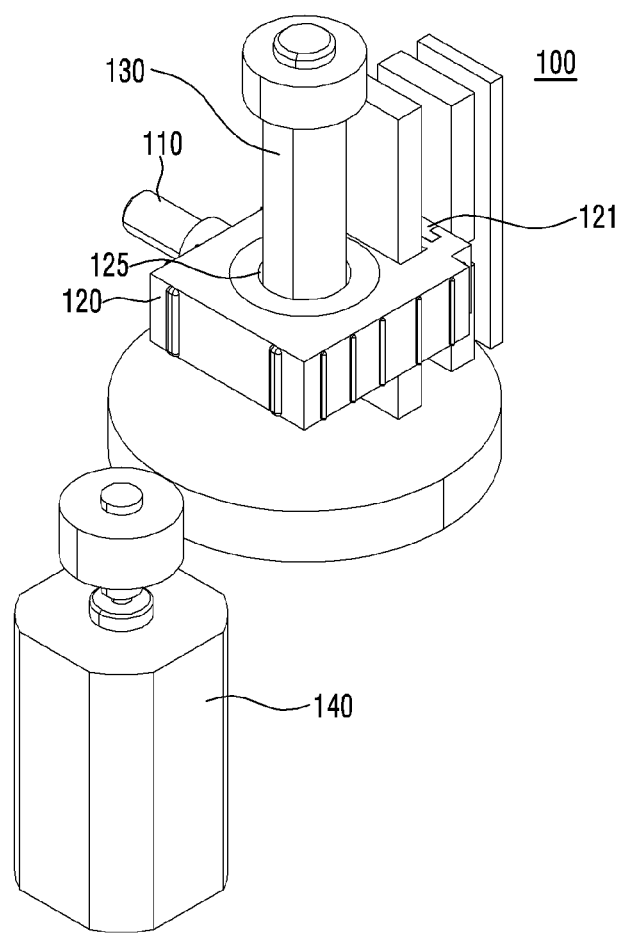
Figure 10C:
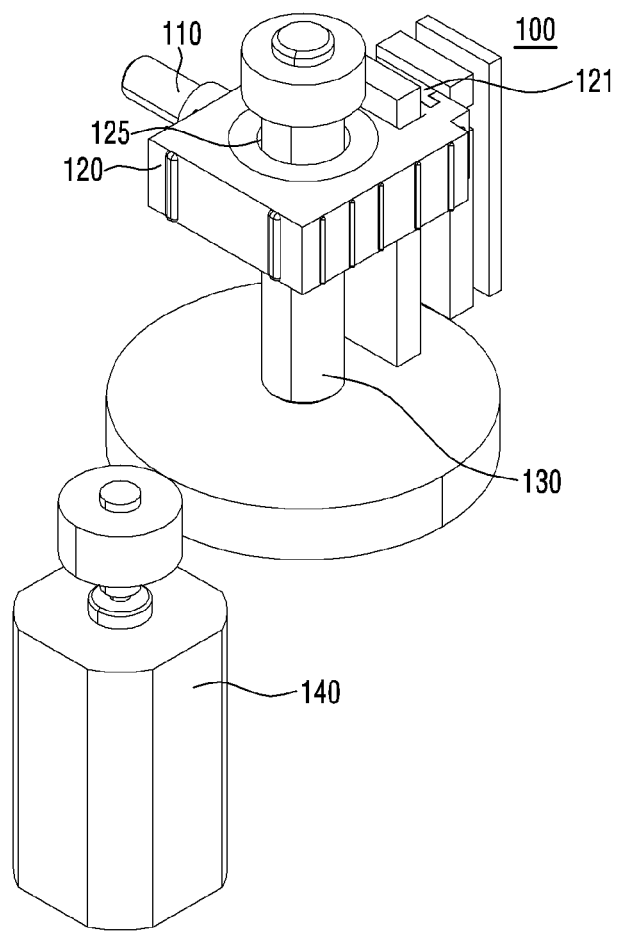

FIGS. 10a to 10c show the first fixing part 100 of the vehicle shift control lever device 1 according to the embodiment.

Referring to FIGS. 2, 6, 8, and 10a to 10c, the vehicle shift control lever device 1 according to the embodiment may further include the first fixing part 100.

The first fixing part 100 may be installed in the housing 10. The first fixing part 100 may include the first fixing pin 110 of which one end is inserted into the spindle bearing recess 642 formed in the spindle bearing 640, a first moving member 120 which is connected to the other end of the first fixing pin 110 and has a recess 125 formed therein, a worm-shaft 130 which passes through the recess 125 of the first moving member 120, a driving member 140 which rotates the worm-shaft 130, and a hall sensor 150 which detects the movement of the first moving member 120.

Specifically, the first fixing pin 110 may be inserted into the spindle bearing recess 642 formed in the spindle bearing 640 and restrict the shift direction movement of the transmission rod 600 in accordance with the shift position.

The first moving member 120 may be fixed and installed not to move in the forward, backward, right, and left directions of the vehicle and to move only in the upward and downward directions. Therefore, the first fixing pin 110 connected to the first moving member 120 is also able to move only in the upward and downward directions. Also, the first moving member 120 may include a magnetic material.

Specifically, the first moving member 120 may include a magnetic part 121 which has a magnetism and is disposed on one end thereof closer to the hall sensor 150.

The driving member 140 may rotate clockwise or counterclockwise as the shift position is changed.

The worm-shaft 130 may convert the rotary motion of the driving member 140 into a linear motion. Specifically, the worm-shaft 130 uses the clockwise or counterclockwise rotation of the driving member 140, thereby moving, as shown in FIG. 10b, the first moving member 120 and the first fixing pin 110 downward and thereby moving, as shown in FIG. 10c, the first moving member 120 and the first fixing pin 110 upward.

The hall sensor 150 may detect the position of the first moving member 120 by using the magnetic field lines of the magnetic part 121 of the first moving member 120. Here, the magnetic field lines of a magnet have a property of establishing the equilibrium. Due to such a property of the magnetic field lines, the magnetic force of a side toward which the magnet moves becomes stronger, and the magnetic force of the other side becomes weaker. Accordingly, the magnetic field lines have a property of moving from the weaker magnetic force side to the stronger magnetic force side.

The hall sensor 150 measures the magnetic force by detecting a place to which the magnetic field lines move, thereby confirming the position of the first moving member 120. Here, if the position of the first moving member 120 detected by the hall sensor 150 is not a predetermined position, the position of the first moving member 120 is reset by using the driving member 140.

Hereafter, the operation of the first fixing part 100 will be described.

Figure 11A:
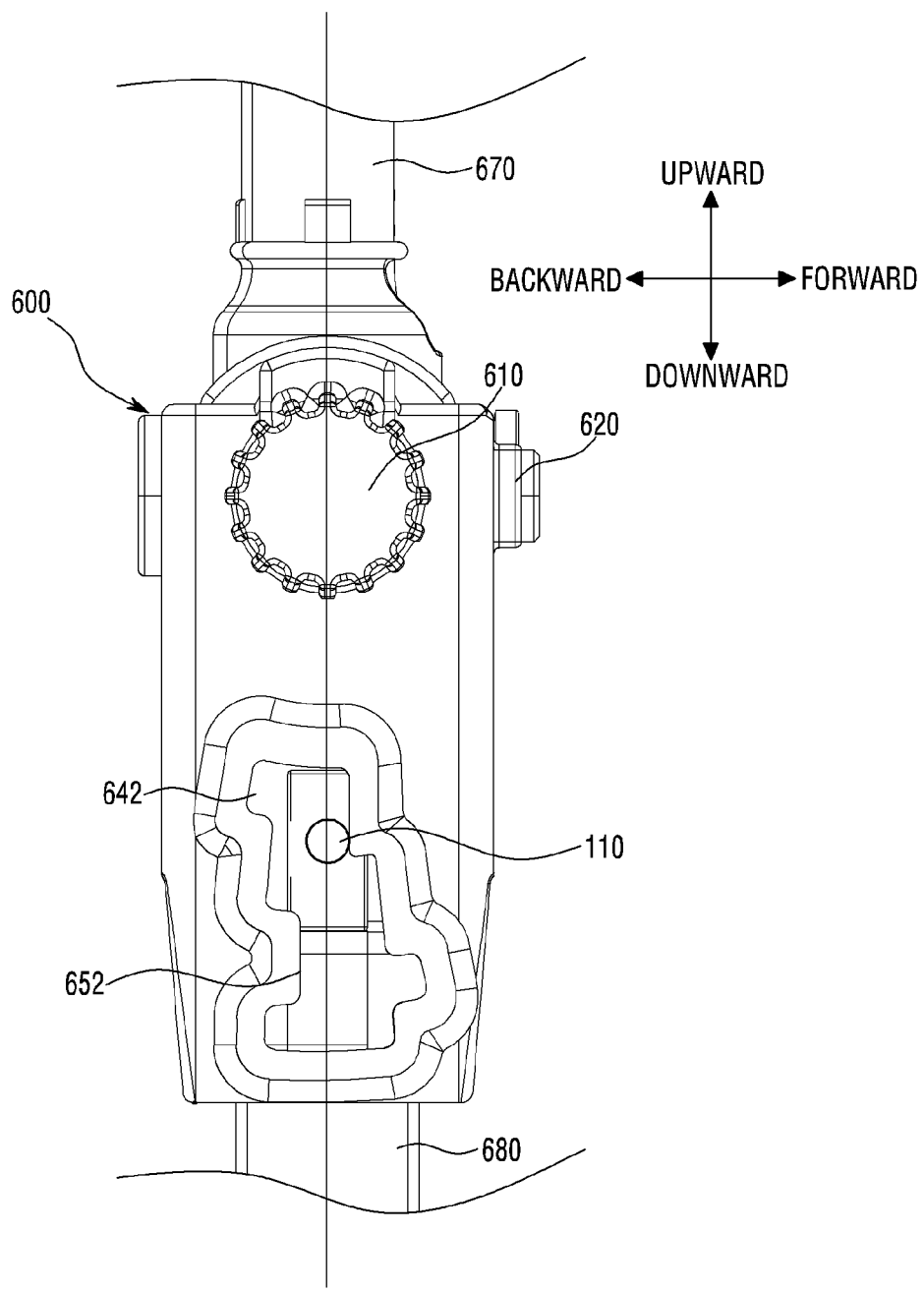
FIGS. 11a and 11b show an example for describing the operation of the first fixing part.
Figure 11B:
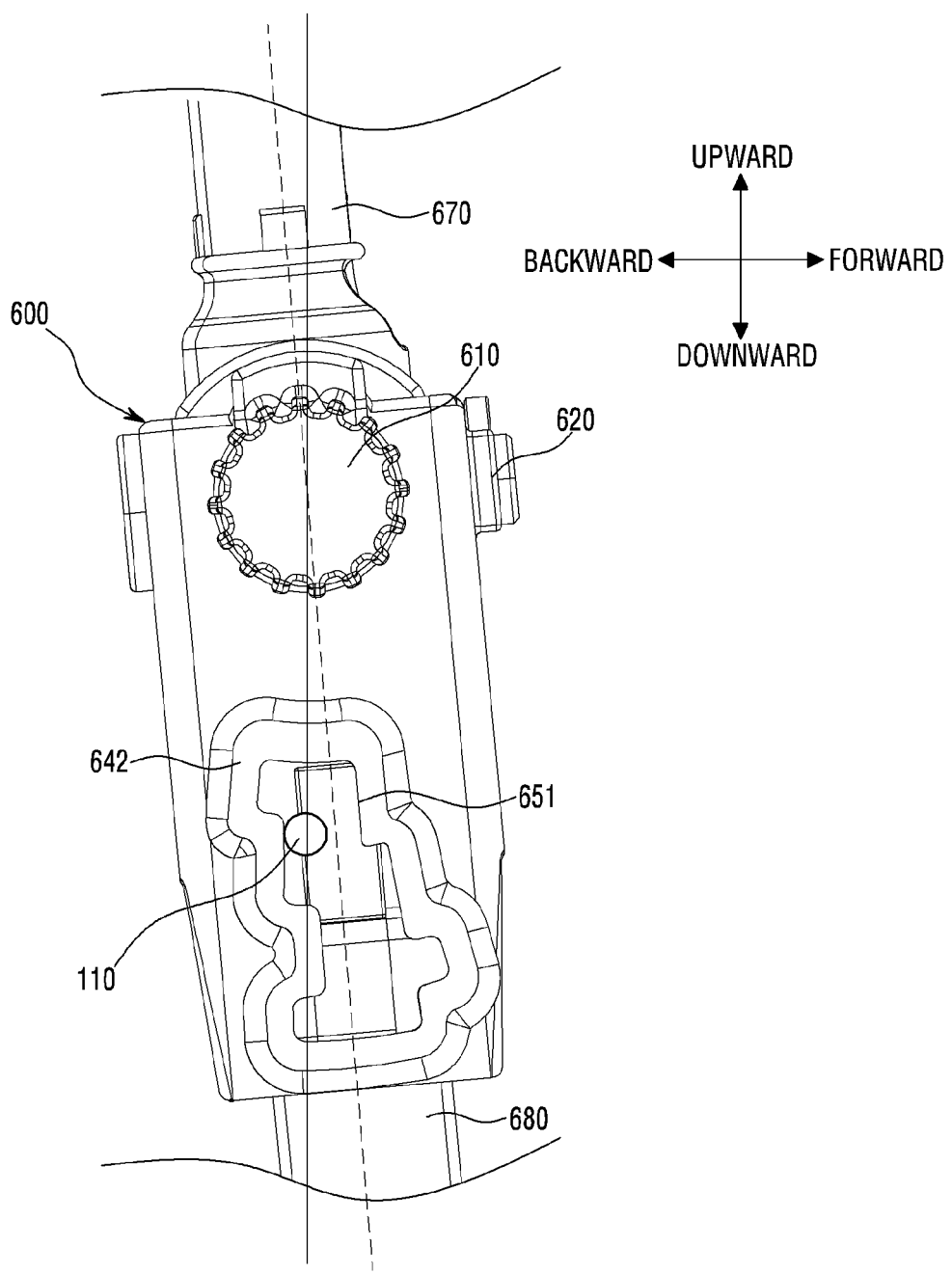
Figure 12A:
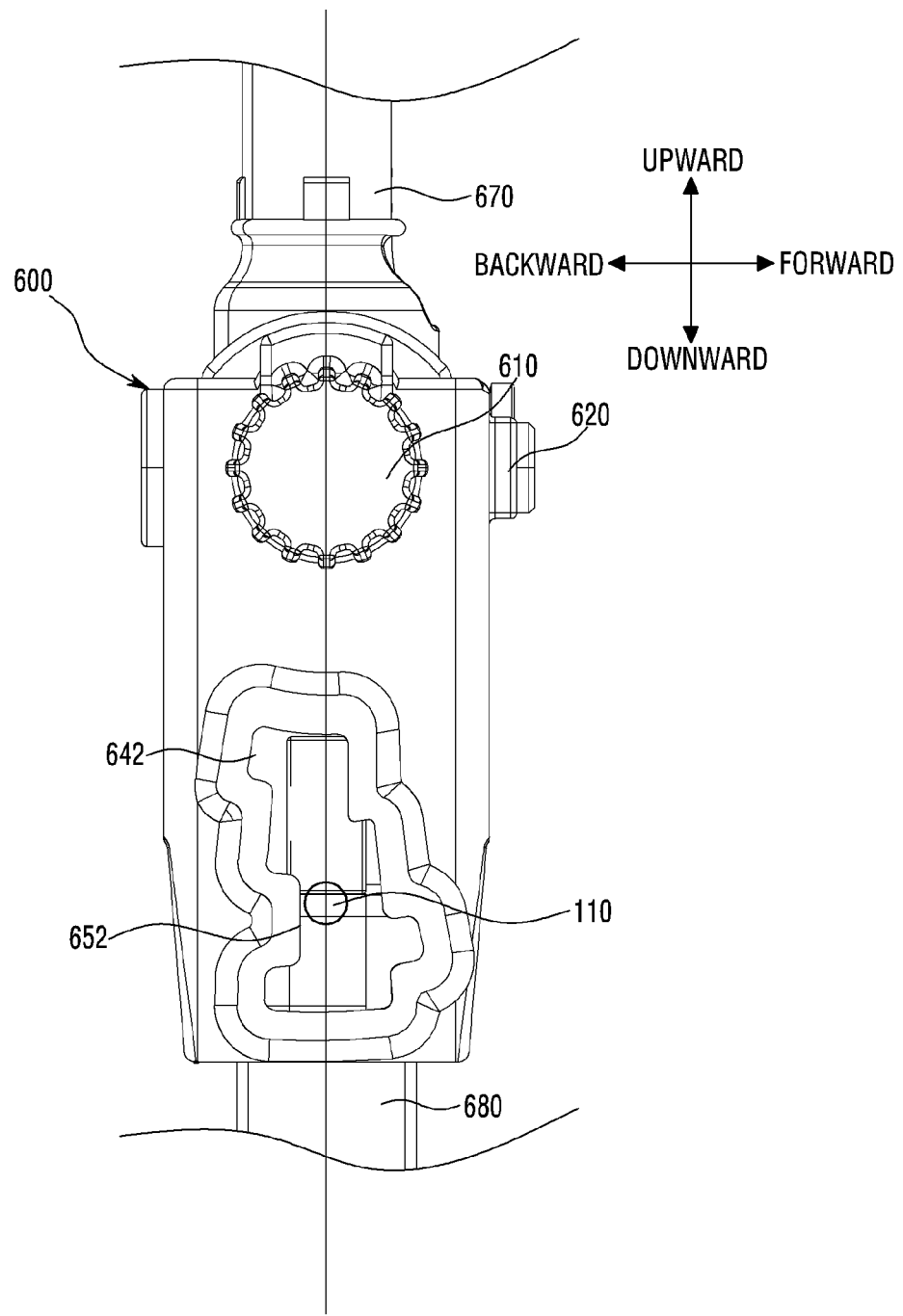
FIGS. 12a and 12b show another example for describing the operation of the first fixing part.
Figure 12B:
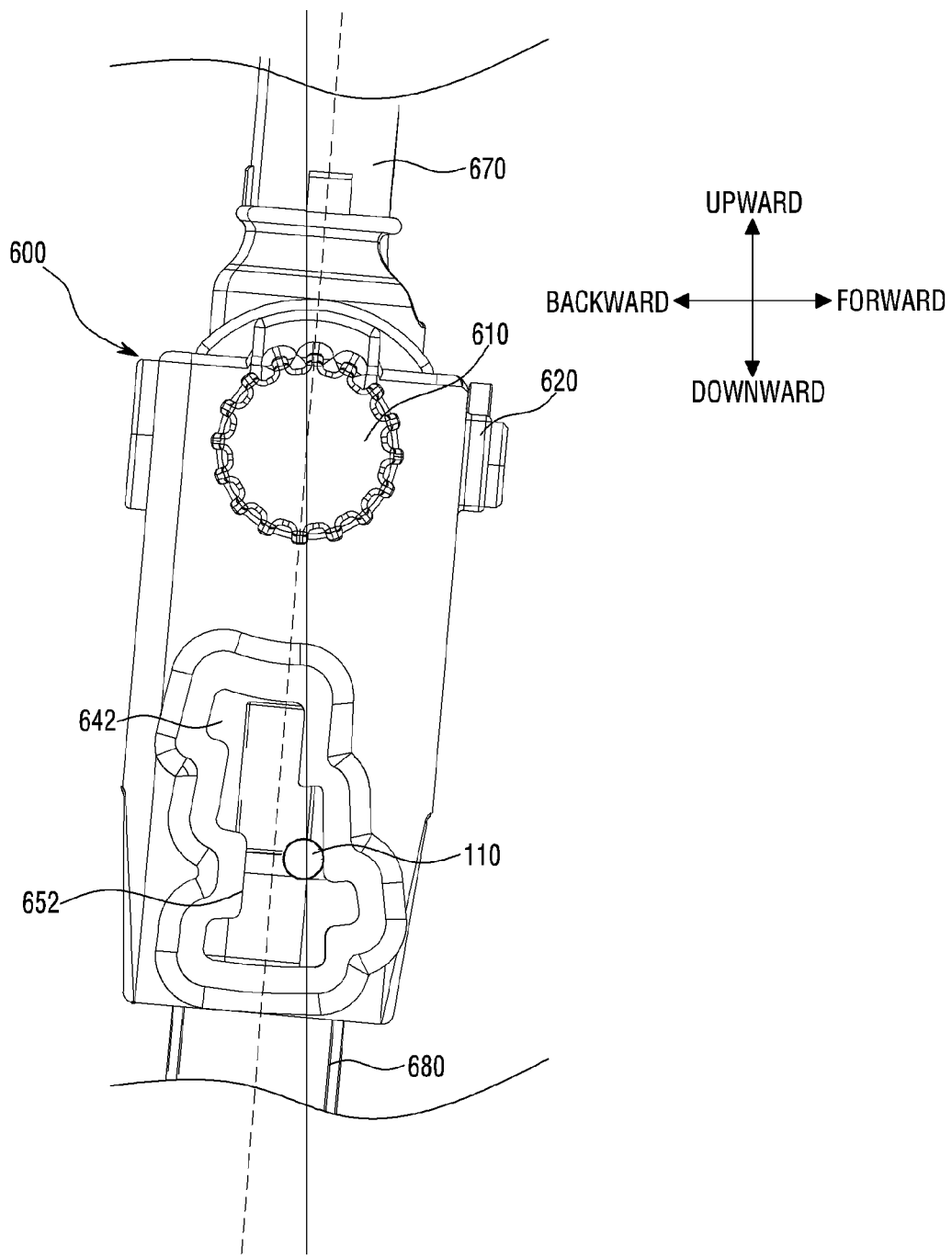

FIGS. 11a and 11b show an example for describing the operation of the first fixing part. FIGS. 12a and 12b show another example for describing the operation of the first fixing part. Specifically, FIGS. 11 and 12 are right side views of the transmission rod 600 shown in FIG. 6.

Referring to FIGS. 8, 9, 11, and 12, the first fixing part 100 may restrict the shift direction pivoting of the transmission rod 600 in accordance with the shift position.

As the transmission rod 600 is operated, the guide 60 moves and the single sensor 73 detects the movement and transmits information on the operation of the transmission rod 600 to a main PCB. The main PCB which has received the operation information may set a new shift position by using the previous shift position and the operation information. After that, the driving member 140 rotates clockwise or counterclockwise in accordance with the new shift position information that the main PCB has received, and thus, moves the first fixing pin 110 to a position corresponding to the new shift position.

For example, when the current shift position is the R-shift position, the first fixing pin 110 restricts the transmission rod upper portion 670 from pivoting forward about the shift direction rotation axis 610. Specifically, as shown in FIGS. 11a and 11b, when the shift position is changed to the R-shift position, the first fixing pin 110 of the first fixing part 100 moves to the second position. When the first fixing pin 110 moves to the second position, the front side of the first fixing pin 110 contacts the front catching surface 651 of the spindle bearing recess 642. Accordingly, the rearward pivoting of the transmission rod lower portion 680, in other words, the forward pivoting of the transmission rod upper portion 670 is restricted, and the rearward pivoting of the transmission rod upper portion 670 is allowed, so that the shift position can be changed from the R-shift position to N-shift position.

Here, when a predetermined condition is satisfied in the state where the shift position is the R-shift position, the first fixing pin 110 of the first fixing part 100 moves to a first position. When the first fixing pin 110 moves to the first position, the forward pivoting of the transmission rod upper portion 670 is restricted, and more rearward pivoting of the transmission rod upper portion 670 is allowed than that at the second position, so that the shift position can be changed from the R-shift position to D-shift position at a time. Therefore, only when the predetermined condition is satisfied, the shift position can be changed from the R-shift position to D-shift position at a time.

Similarly, when the current shift position is the N-shift position, the first fixing pin 110 restricts the transmission rod upper portion 670 from pivoting forward about the shift direction rotation axis 610. Specifically, when the shift position is changed to the N-shift position, the first fixing pin 110 of the first fixing part 100 moves to the second position. When the first fixing pin 110 moves to the second position, the forward pivoting of the transmission rod upper portion 670 is restricted, and thus, the shift position cannot be changed from the N-shift position to R-shift position, and the rearward pivoting of the transmission rod upper portion 670 is allowed. Therefore, the shift position can be changed from the N-shift position to R-shift position.

Here, when a predetermined condition is satisfied in the state where the shift position is the N-shift position, the first fixing pin 110 of the first fixing part 100 moves to the third position. When the first fixing pin 110 of the first fixing part 100 moves to the third position, both the forward and rearward pivoting of the transmission rod upper portion 670 are allowed, so that the shift position can be changed from the N-shift position to R-shift position or D-shift position. Therefore, only when the predetermined condition is satisfied, the shift position can be changed from the N-shift position to R-shift position.

The rearward pivoting of the transmission rod upper portion 670 is always allowed at the N-shift position. However, when the shift position is changed from the N-shift position to D-shift position in a state where the vehicle travels backward at a speed greater than a below-described safe shift possible speed, it is impossible to safely change the shift position. Therefore, when the vehicle travels backward at a speed greater than the safe shift possible speed, it is possible to prevent the shift position from being changed from the N-shift position to D-shift position by software even though the transmission rod upper portion 670 is pivoted rearward.

Also, when the current shift position is the D-shift position, the first fixing pin 110 restricts the transmission rod upper portion 670 from pivoting rearward about the shift direction rotation axis 610. Specifically, as shown in FIGS. 12a and 12b, when the shift position is changed to the D-shift position, the first fixing pin 110 of the first fixing part 100 moves to the fourth position. When the first fixing pin 110 moves to the fourth position, the front side of the first fixing pin 110 contacts the first rear catching surface 652 of the spindle bearing recess 642. Accordingly, the forward pivoting of the transmission rod lower portion 680, in other words, the rearward pivoting of the transmission rod upper portion 670 is restricted, and the forward pivoting of the transmission rod upper portion 670 is allowed, so that the shift position can be changed from the D-shift position to N-shift position.

Here, when a predetermined condition is satisfied in the state where the shift position is the D-shift position, the first fixing pin 110 of the first fixing part 100 moves to the fifth position. When the first fixing pin 110 moves to the fifth position, the rearward pivoting of the transmission rod upper portion 670 is restricted, and more forward pivoting of the transmission rod upper portion 670 is allowed than that at the fourth position, so that the shift position can be changed from the D-shift position to R-shift position at a time. Therefore, only when the predetermined condition is satisfied, the shift position can be changed from the D-shift position to R-shift position at a time.

Also, for the purpose of changing the shift position to the P-shift position in the state where the shift position is the R, D or N-shift position, when the transmission rod upper portion 670 is pivoted in a right direction in a state where a predetermined condition is satisfied, the first fixing pin 110 of the first fixing part 100 moves to the fifth position. When the first fixing pin 110 moves to the fifth position, the rearward pivoting of the transmission rod upper portion 670 is restricted and the forward pivoting of the transmission rod upper portion 670 is allowed. Therefore, the shift position can be changed to the P-shift position.

Also, when the shift position is changed to the M-shift position, the first fixing pin 110 of the first fixing part 100 moves to the sixth position. When the first fixing pin 110 moves to the sixth position, both the forward and rearward pivoting of the transmission rod upper portion 670 are allowed and the shift position can be manually changed to an upper or lower position.

Here, the predetermined condition allows the shift position to be changed to the R or P-shift position, changed from the R-shift position to D-shift position, or changed from the D-shift position to R-shift position. In order to prevent the driver from unintentionally changing the shift position and from changing the shift position during driving at a high speed making it impossible to safely change the shift position and in order to enable the driver to intentionally change the shift position and to change the shift position only during driving at a speed making it possible to safely change the shift position, the predetermined condition may be that brake and unlock buttons are in an on-state and the speed of the vehicle is the safe shift possible speed. The safe shift possible speed means a speed allowing the driver to safely change the shift position when the vehicle is in a stationary state or is driven at a very low speed. The safe shift possible speed may be less than 6 km/h, including the forward and backward driving of the vehicle.

Figure 13:
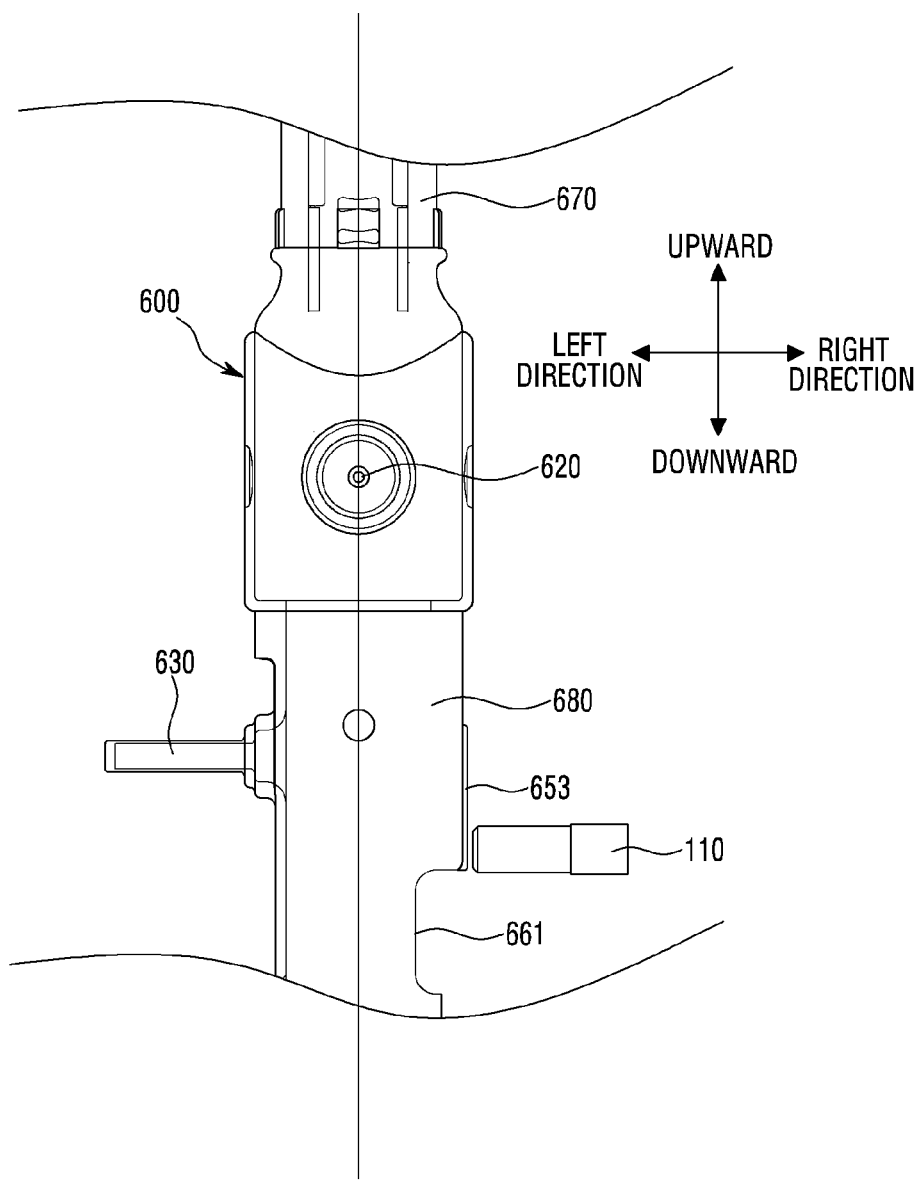
FIGS. 13 to 15 are rear cross sectional views of the transmission rod 600 and a first fixing pin 110 shown in FIGS. 4 and 8.
Figure 14:
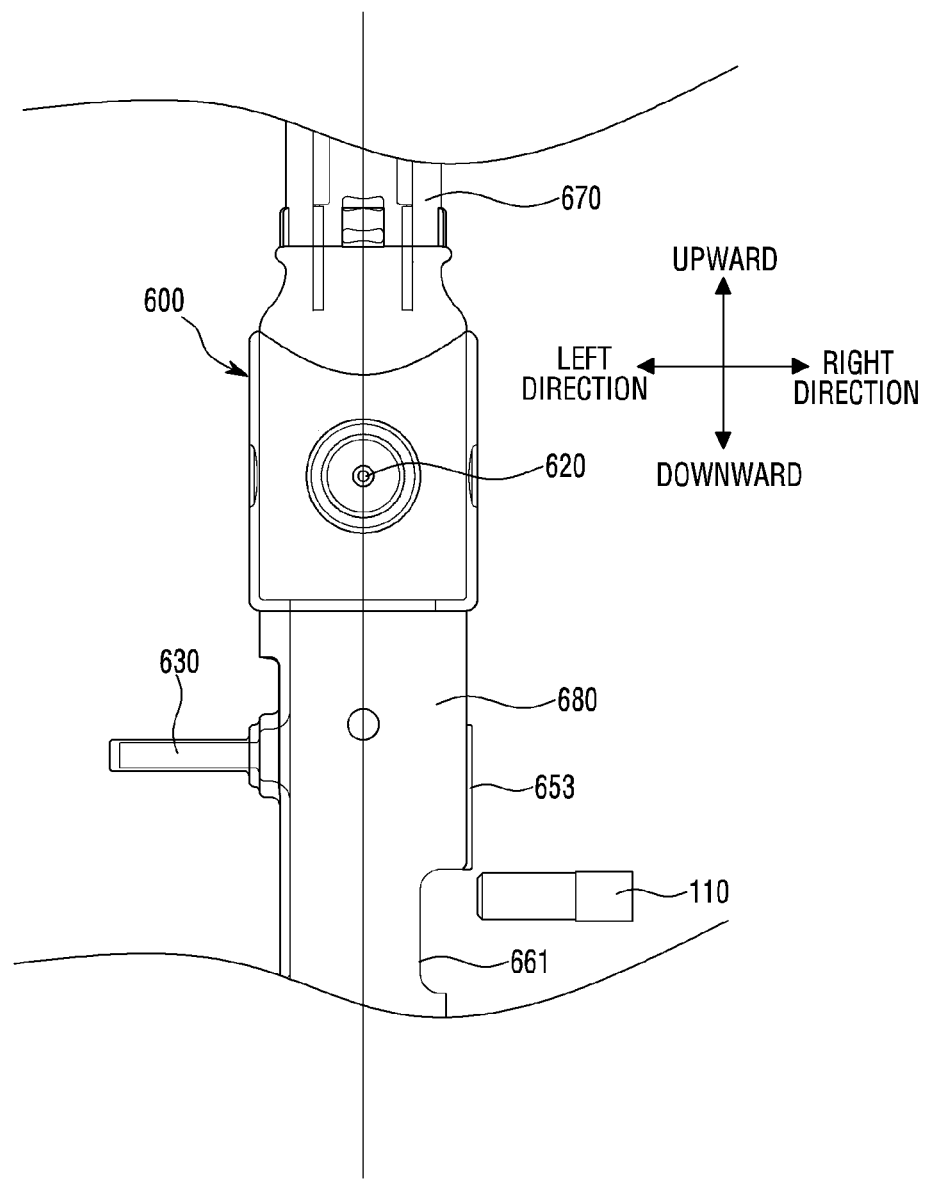
Figure 15:
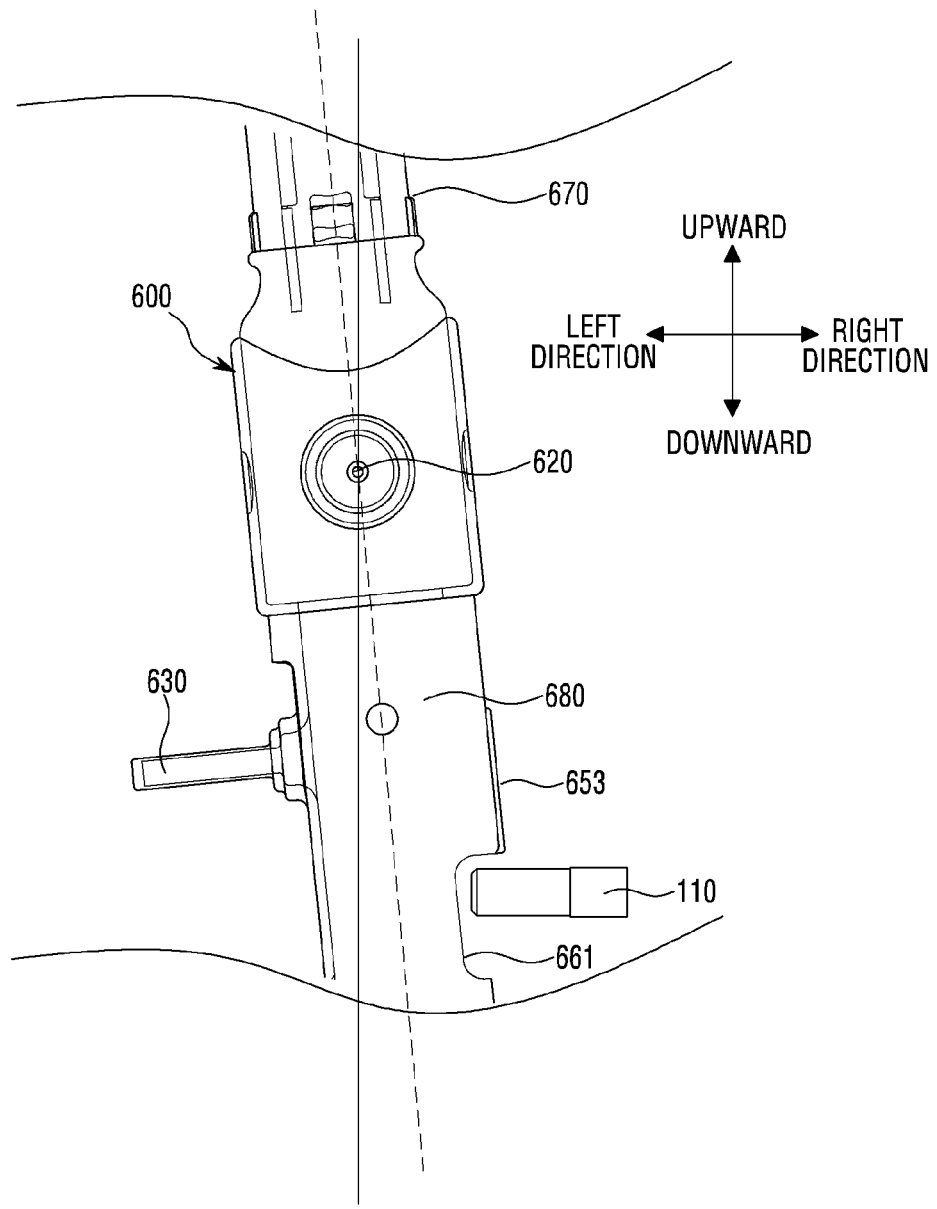

FIGS. 13 to 15 are rear cross sectional views of the transmission rod 600 and the first fixing pin 110 shown in FIGS. 4 and 8. Specifically, FIG. 13 shows that the first fixing pin 110 is located at the third position. FIG. 14 shows that the first fixing pin 110 is located at the fourth position. FIG. 15 shows that the transmission rod upper portion 670 of FIG. 14 has been pivoted in the left direction.

The first fixing part 100 may restrict the select direction pivoting of the transmission rod 600 in accordance with the shift position. For example, when the shift position is changed to the R or D-shift position, the first fixing pin 110 of the first fixing part 100 moves to one of the first to third positions, so that the first fixing part 100 restricts the left direction pivoting of the transmission rod upper portion 670.

Meanwhile, the first fixing part 100 may allow the transmission rod 600 to pivot in the select direction in accordance with the shift position. For example, when the shift position is changed to the D or M-shift position, the first fixing pin 110 of the first fixing part 100 moves to the fourth to sixth positions, so that the transmission rod upper portion 670 may be pivoted in the left direction.

Specifically, as shown in FIG. 13, when the first fixing pin 110 is located at the third position, the end of the first fixing pin 110 is caught by the left catching surface 653 of the transmission rod 600, so that the first fixing part 100 is able to restrict the left direction pivoting of the transmission rod upper portion 670. Similarly, when the first fixing pin 110 is located at the first or second position, the end of the first fixing pin 110 is caught by the left catching surface 653 of the transmission rod 600, so that the first fixing part 100 is able to restrict the left direction pivoting of the transmission rod upper portion 670. As a result, the shift position cannot be changed from the R or N-shift position to M-shift position.

Meanwhile, when the first fixing pin 110 is located at the fourth position as shown in FIG. 14, even if the transmission rod upper portion 670 is pivoted in the left direction as shown in FIG. 15, the end of the first fixing pin 110 is not caught by the left catching surface 653 of the transmission rod 600 and is inserted into the first recess 661. Therefore, the transmission rod upper portion 670 can be pivoted in the left direction. Likewise, when the first fixing pin 110 is located at the fifth or sixth position, the end of the first fixing pin 110 is not caught by the left catching surface 653 of the transmission rod 600 and is inserted into the first recess 661. Therefore, the transmission rod upper portion 670 can be pivoted in the left direction, so that the shift position can be changed from the D-shift position to M-shift position or from the M-shift position to D-shift position.

Figure 16:
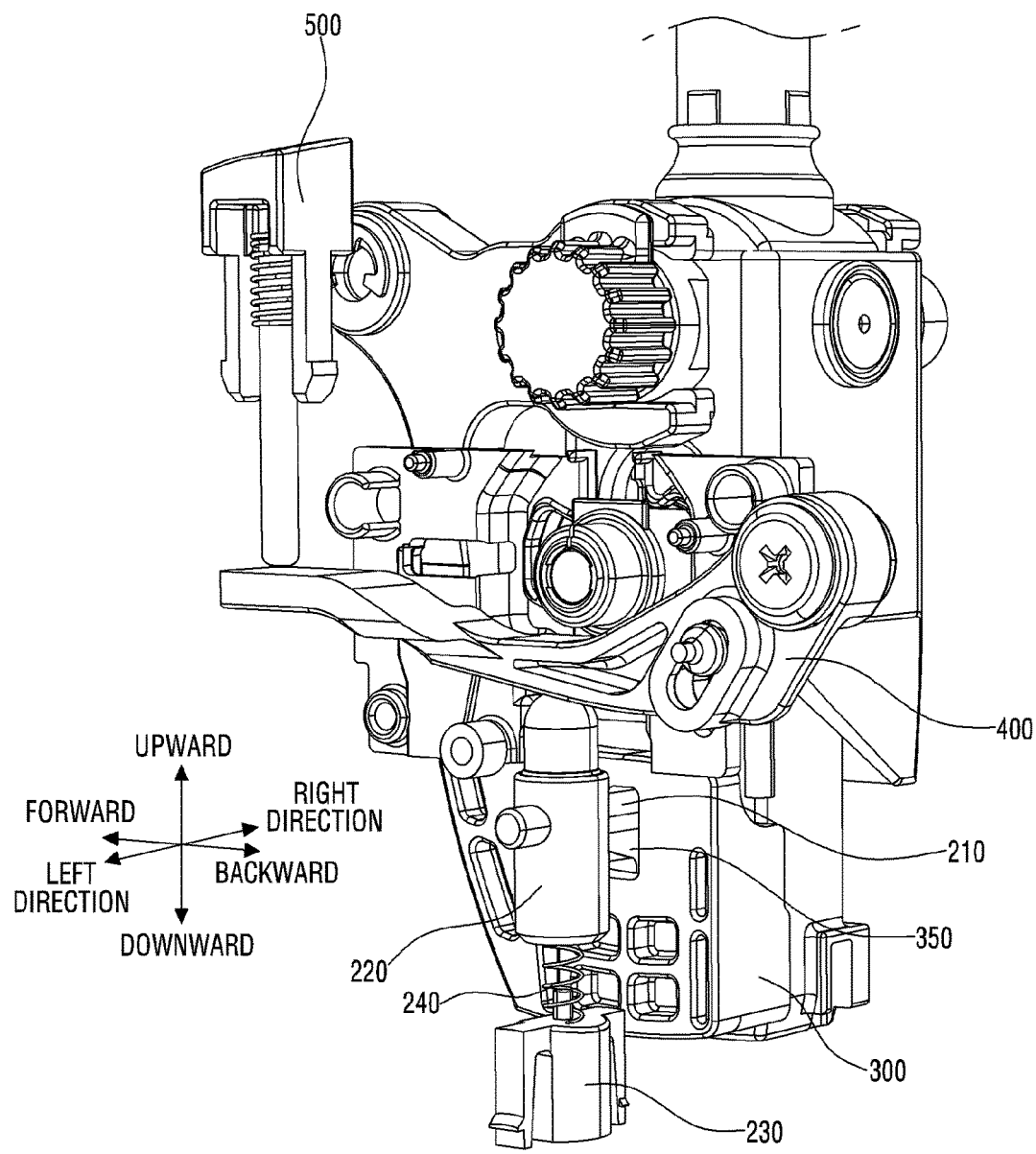
FIGS. 16 and 17 are views for describing a second fixing part 200 of the vehicle shift control lever device 1 according to the embodiment.
Figure 17:
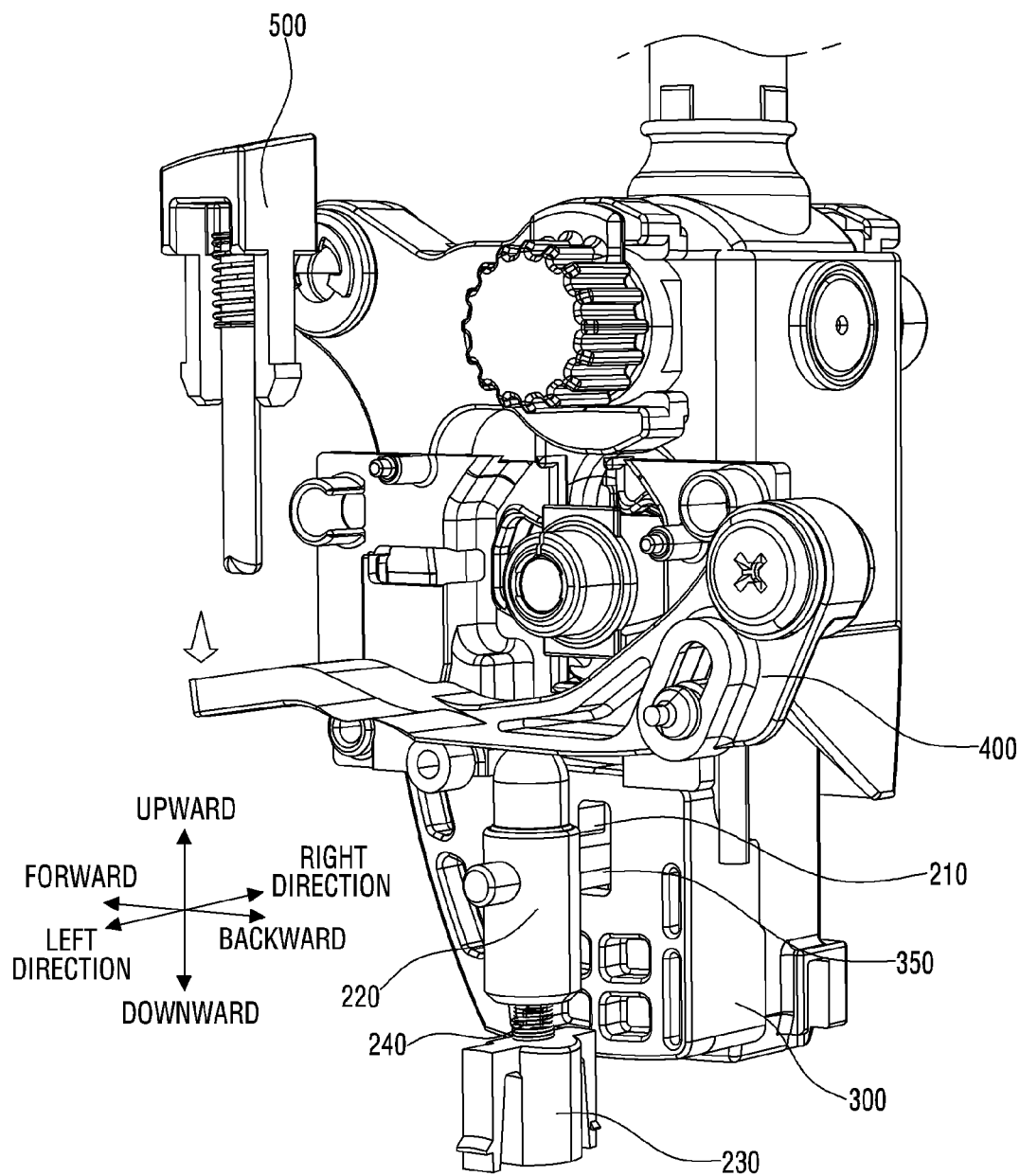
Figure 18:
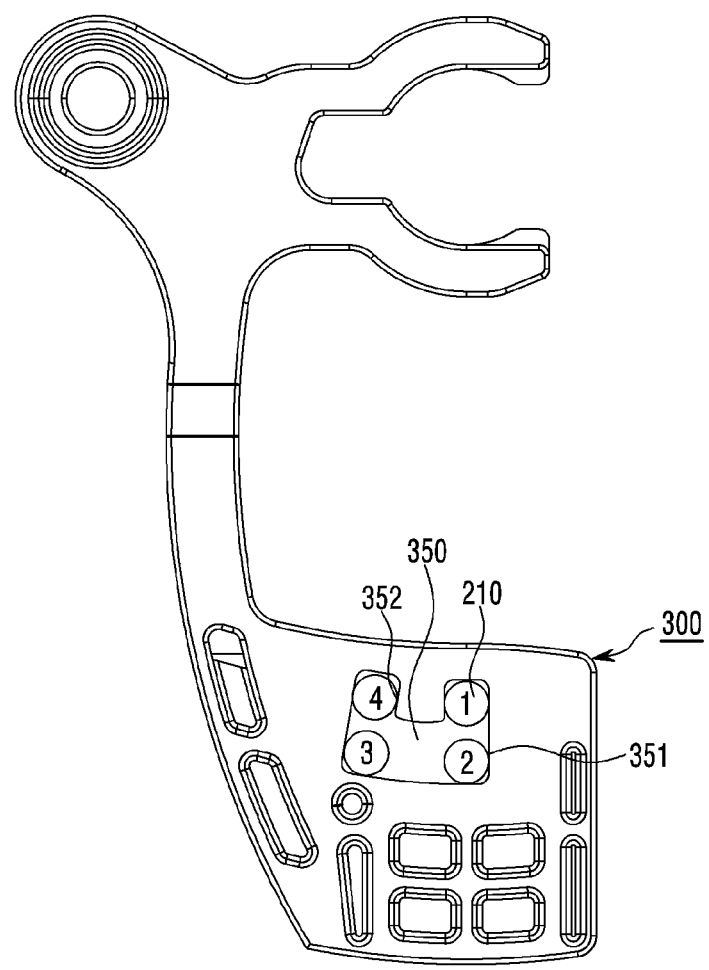
FIG. 18 is a left side view of a plate 300 shown in FIGS. 16 and 17.

FIGS. 16 and 17 are views for describing the second fixing part 200 of the vehicle shift control lever device 1 according to the embodiment. FIG. 18 is a left side view of a plate 300 shown in FIGS. 16 and 17.

Referring to FIGS. 16 to 18, the vehicle shift control lever device 1 according to the embodiment may further include the second fixing part 200, the plate 300, and a pressing portion 400.

The plate 300 may include a plate recess 350 formed on one side thereof.

As shown in FIG. 18, the plate recess 350 may be formed such that the second fixing pin 210 of the second fixing part 200 moves to the first to fourth positions. Specifically, the first position is the top right of the plate recess 350 where the second fixing pin 210 is placed. The second position is the bottom right of the plate recess 350 where the second fixing pin 210 is placed. The third position is the bottom left of the plate recess 350 where the second fixing pin 210 is placed. The fourth position is the top left of the plate recess 350 where the second fixing pin 210 is placed.

A second rear catching surface 351 and a third rear catching surface 352 may be formed on the circumference of the plate recess 350 such that the shift direction pivoting of the transmission rod 600 is restricted in accordance with the first to fourth positions of the second fixing pin 210 of the second fixing part 200.

The second fixing part 200 may include the second fixing pin 210 of which one end is inserted into the plate recess 350 formed in the plate 300, a second moving member 220 which is connected to the other end of the second fixing pin 210, a fixing member 230 which is disposed at the base bracket 11 and is separated from the second moving member 220 by a predetermined distance, and an elastic member 240 which is disposed between the second moving member 220 and the fixing member 230.

The second moving member 220 may be fixed and installed not to move in the forward, backward, right, and left directions of the vehicle and to move only in the upward and downward directions. Therefore, the second fixing pin 210 connected to the second moving member 220 is also able to move only in the upward and downward directions.

The second moving member 220 moves in a direction closer to the fixing member 230 by the pressing portion 400. Here, when the predetermined condition is satisfied, the pressing portion 400 is pivoted downwardly and presses the second moving member 220 downwardly, so that the second moving member 220 becomes closer to the fixing member 230. Therefore, the second fixing pin 210 is moved by the pressing portion 400. Here, if the predetermined condition is not satisfied, the pressing portion 400 is pivoted upwardly and the second fixing pin 210 is moved to its original position by the elastic member 240.

Figure 19:
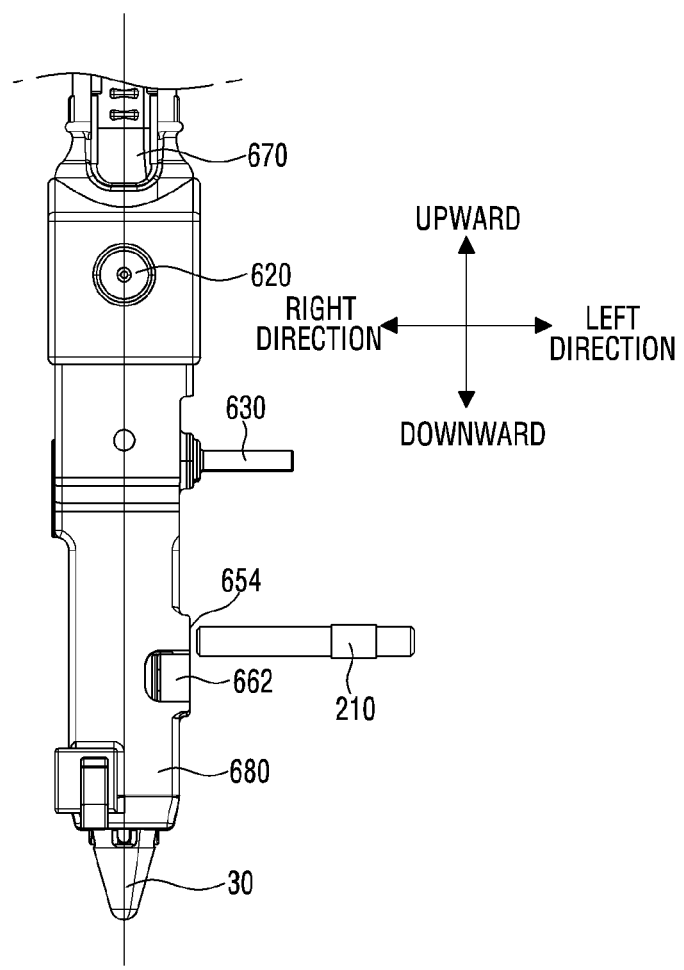
FIGS. 19 to 21 are front views of the transmission rod 600 and a second fixing pin 210 shown in FIGS. 7 and 17.
Figure 20:
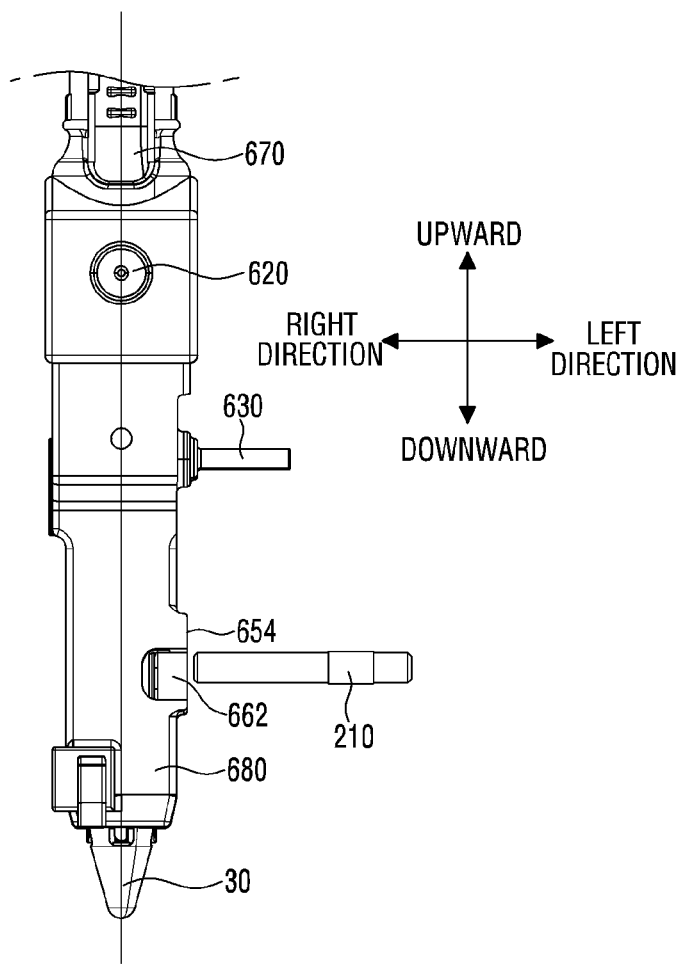
Figure 21:
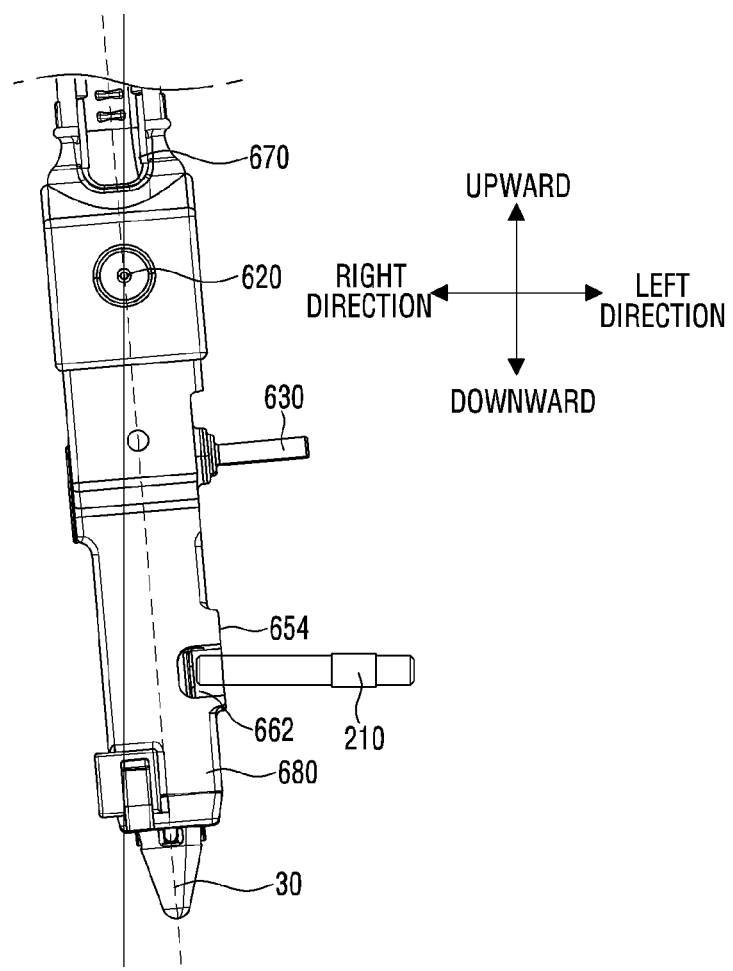

FIGS. 19 to 21 are front views of the transmission rod 600 and the second fixing pin 210 shown in FIGS. 7 and 17. Specifically, FIG. 19 shows that the second fixing pin 210 is located at the first position of the plate recess 350. FIG. 20 shows that the second fixing pin 210 is located at the second position of the plate recess 350. FIG. 21 shows that the transmission rod upper portion 670 of FIG. 20 has been pivoted in the right direction.

The second fixing part 200 may restrict the select direction pivoting of the transmission rod 600. Specifically, when the predetermined condition is not satisfied, the second fixing part 200 places the second fixing pin 210 on the first position, thereby restricting the transmission rod upper portion 670 from being pivoted in the right direction.

Meanwhile, when the predetermined condition is satisfied, the second fixing part 200 places the second fixing pin 210 on the second position, thereby allowing the transmission rod upper portion 670 to be pivoted in the right direction.

For example, as shown in FIG. 19, when the second fixing pin 210 is at the first position, the end of the second fixing pin 210 is caught by the second catching surface 654 of the transmission rod 600. Accordingly, the second fixing part 200 may restrict the right direction pivoting of the transmission rod upper portion 670.

Meanwhile, when the second fixing pin 210 is at the second position as shown in FIG. 20, even if the transmission rod upper portion 670 is pivoted in the right direction as shown in FIG. 21, the end of the second fixing pin 210 is not caught by the second catching surface 654 of the transmission rod 600 and is inserted into the second recess 662. Therefore, the transmission rod upper portion 670 can be pivoted in the right direction.

Here, when the transmission rod upper portion 670 is pivoted in the right direction, the transmission rod lower portion 680 is inserted into the plate 300. Then, as the transmission rod 600 is pivoted in the shift direction, the plate 300 is pivoted in the shift direction in interworking with the transmission rod 600. In a state where the transmission rod upper portion 670 is not pivoted in the right direction, the transmission rod lower portion 680 is not inserted into the plate 300. Therefore, even if the transmission rod 600 is pivoted in the shift direction, the plate 300 does not interwork with the transmission rod 600, and thus, is not pivoted in the shift direction.

Hereafter, an example of changing the shift position to the P-shift position will be described in detail with reference to FIGS. 22 to 27.

Figure 22:
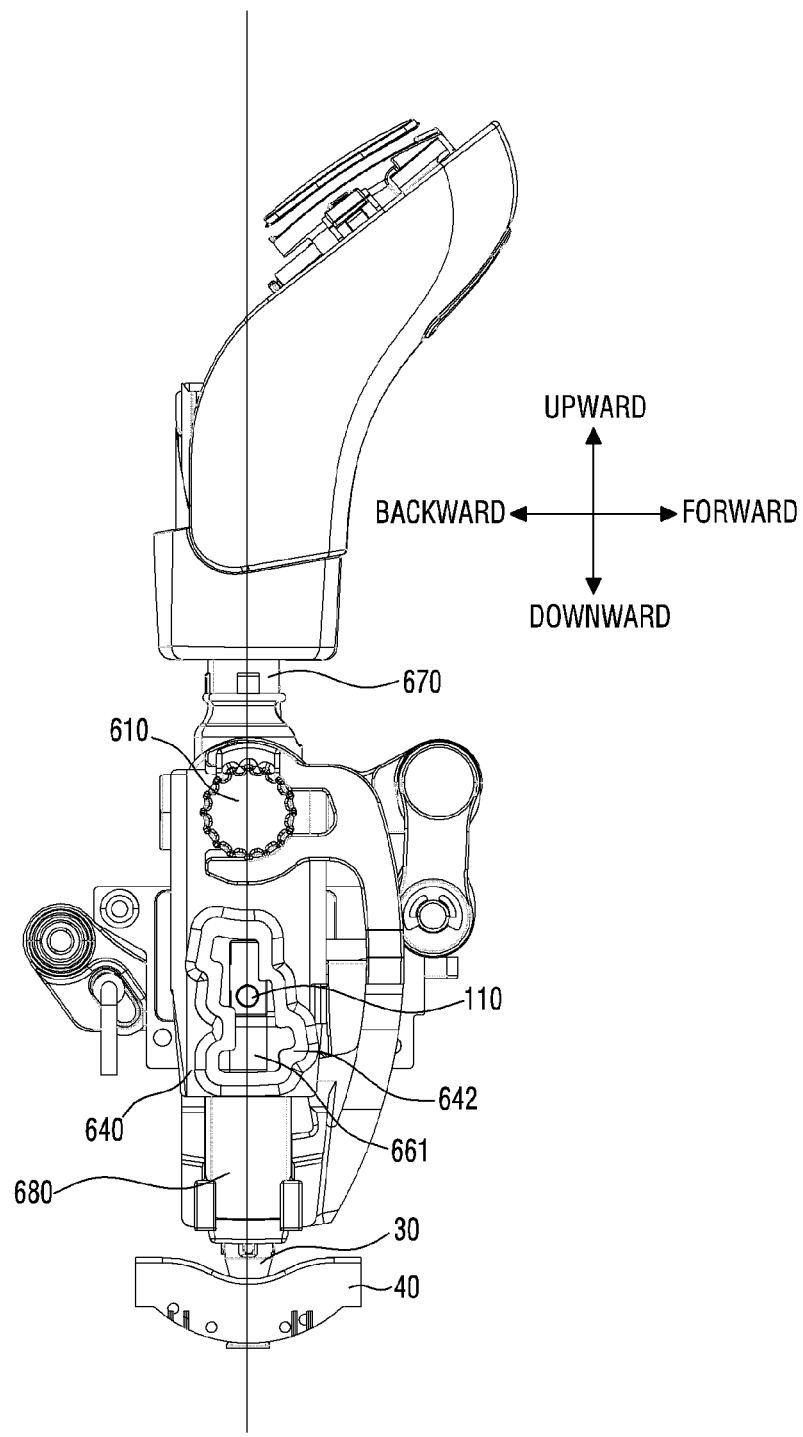
FIG. 22 is a right side view of the vehicle shift control lever device 1 in a state where the detent pin 30 is located at a first stable position "a" shown in FIG. 5.
Figure 23:
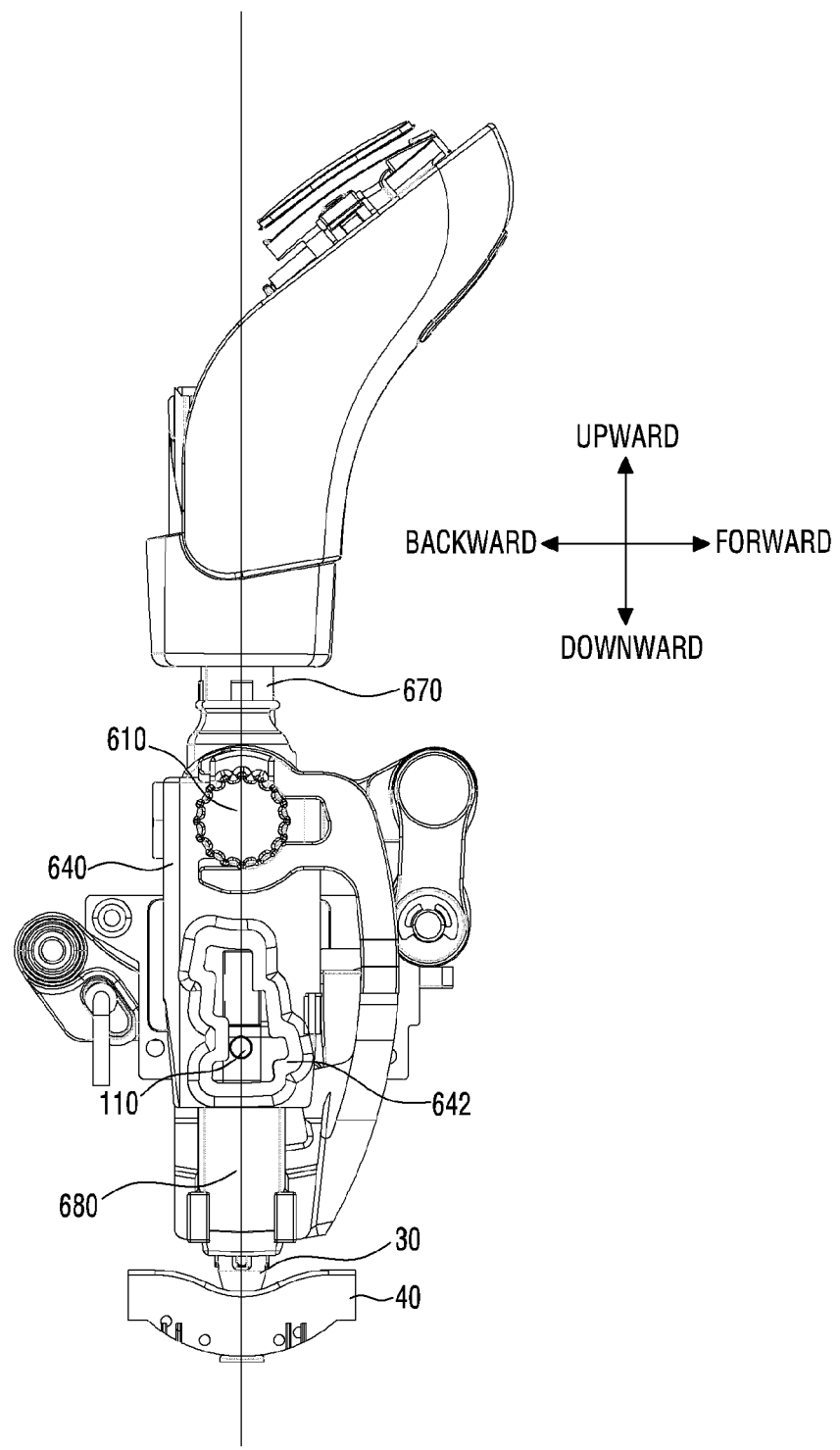
FIG. 23 is a right side view of the vehicle shift control lever device 1 in a state where a transmission rod upper portion 670 has been pivoted in the right direction.
Figure 24:
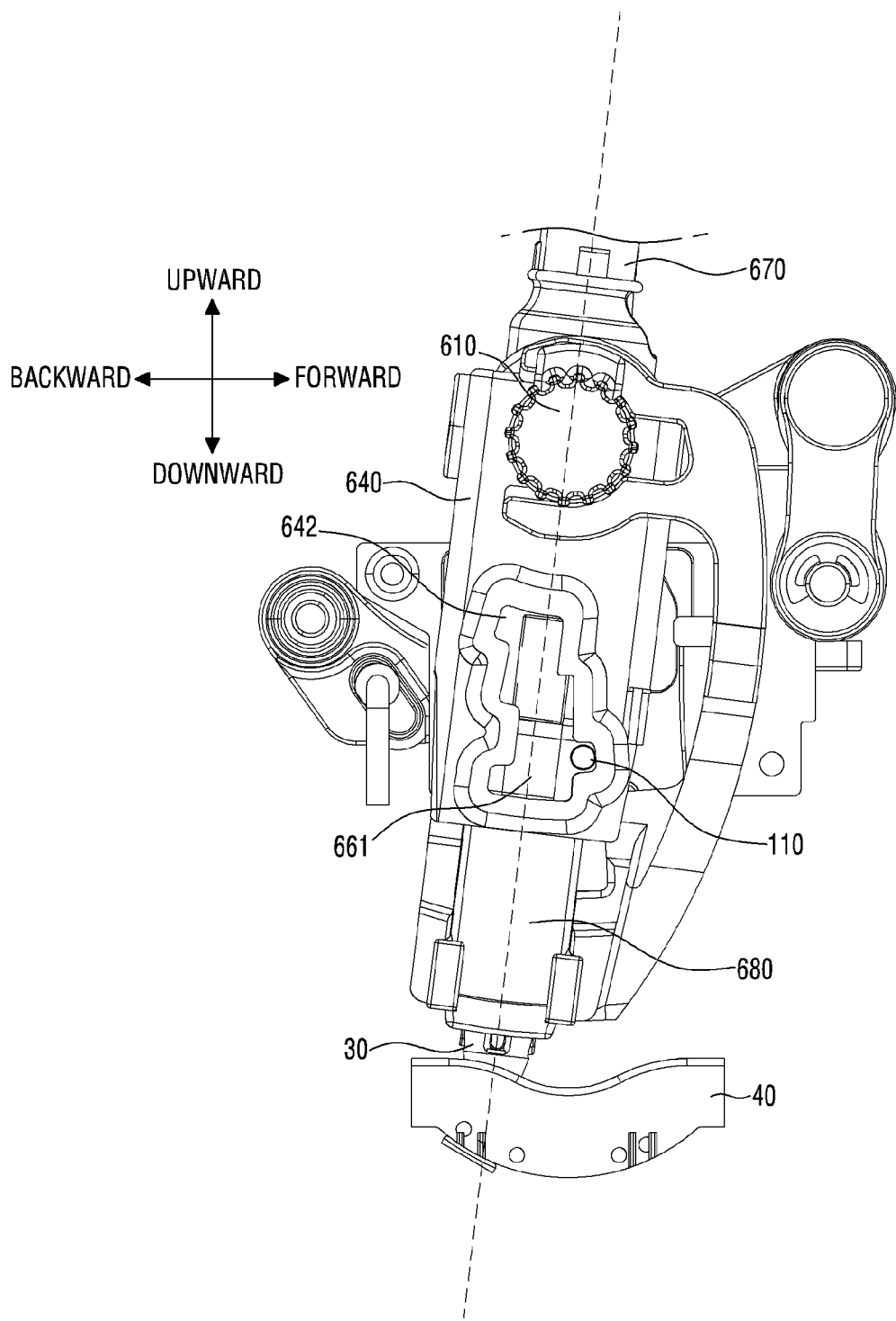
FIG. 24 is a right side view of the vehicle shift control lever device 1 in a state where the detent pin 30 is located at a second stable position "b" shown in FIG. 5.

FIG. 22 is a right side view of the vehicle shift control lever device 1 in a state where the detent pin 30 is located at the first stable position "a" shown in FIG. 5. FIG. 23 is a right side view of the vehicle shift control lever device 1 in a state where the transmission rod upper portion 670 has been pivoted in the right direction. FIG. 24 is a right side view of the vehicle shift control lever device 1 in a state where the detent pin 30 is located at the second stable position "b" shown in FIG. 5.

Figure 25:
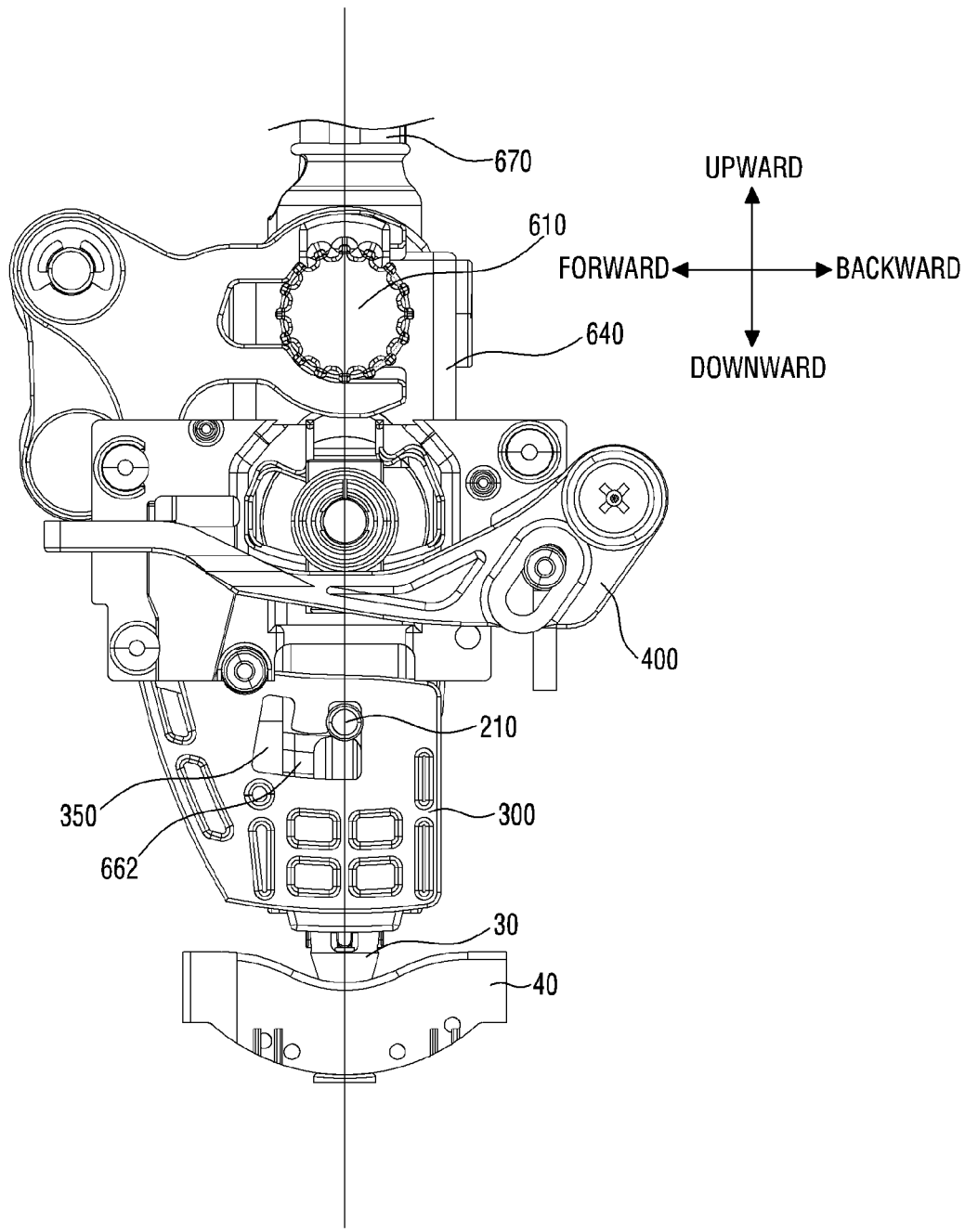
FIG. 25 is a left side view of the vehicle shift control lever device 1 in a state where the detent pin 30 is located at the first stable position "a" shown in FIG. 5.
Figure 26:
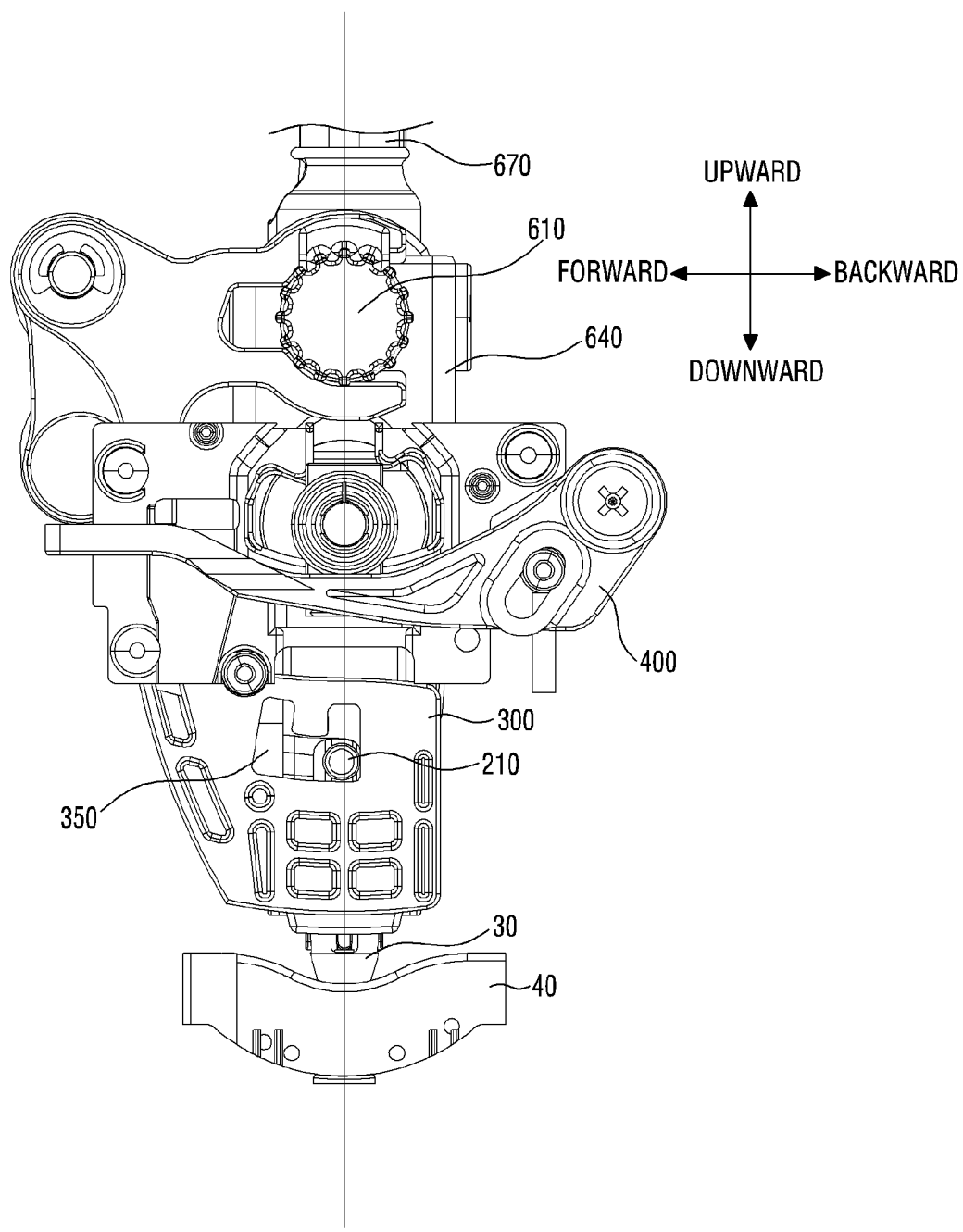
FIG. 26 is a left side view of the vehicle shift control lever device 1 in a state where the transmission rod upper portion 670 has been pivoted in a right direction.
Figure 27:
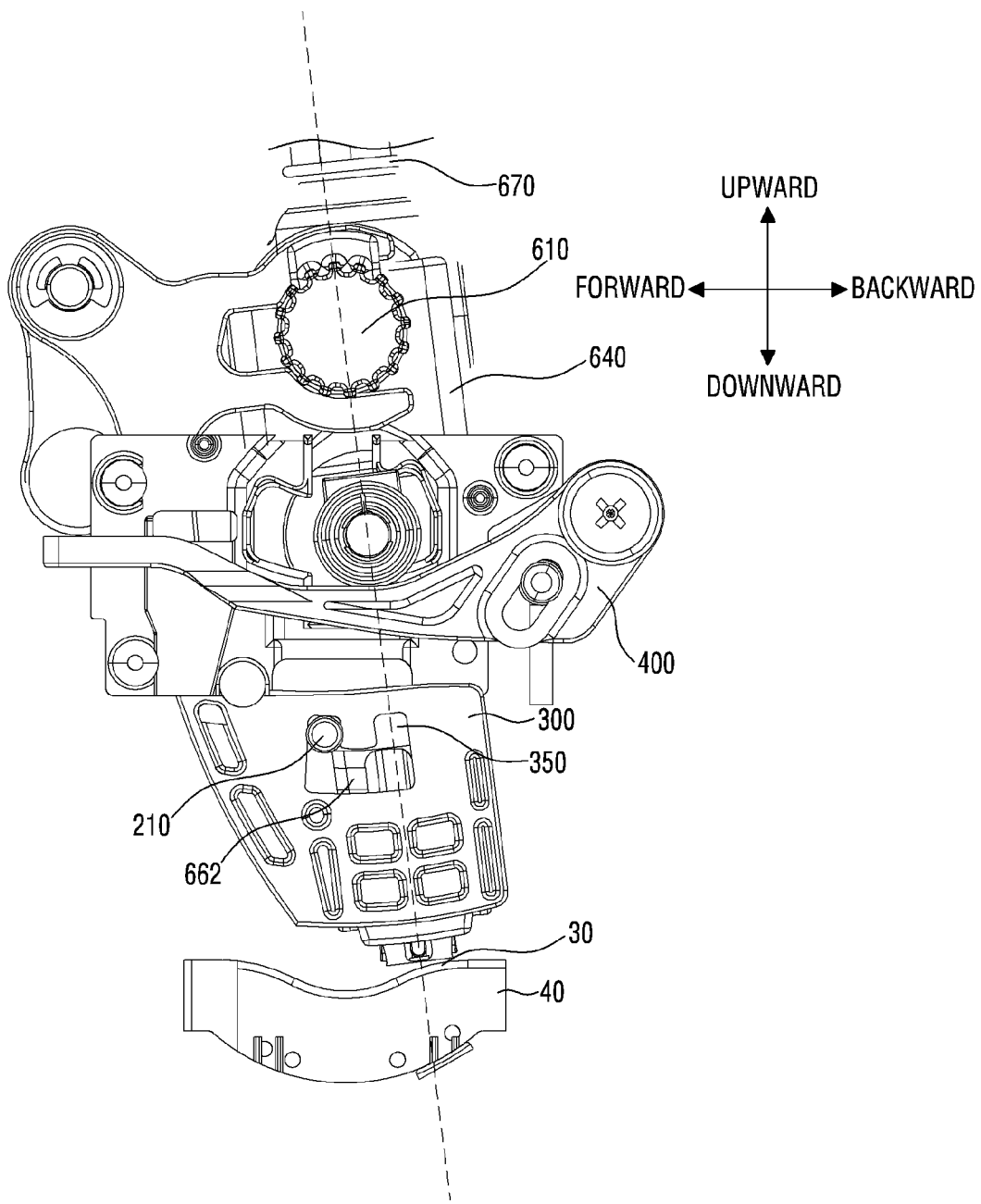
FIG. 27 is a left side view of the vehicle shift control lever device 1 in a state where the detent pin 30 is located at the second stable position "b" shown in FIG. 5.

FIG. 25 is a left side view of the vehicle shift control lever device 1 in a state where the detent pin 30 is located at the first stable position "a" shown in FIG. 5. FIG. 26 is a left side view of the vehicle shift control lever device 1 in a state where the transmission rod upper portion 670 has been pivoted in a right direction. FIG. 27 is a left side view of the vehicle shift control lever device 1 in a state where the detent pin 30 is located at the second stable position "b" shown in FIG. 5.

Referring to FIGS. 22 and 25, when the shift position is R, N, M or D-shift position, the detent pin 30 is placed at the first stable position "a" shown in FIG. 5 and the second fixing pin 210 of the second fixing part 200 is placed at the first position.

Here, the rear side of the second fixing pin 210 of the second fixing part 200 becomes in contact with the second rear catching surface 351 of the plate recess 350. However, in the state where the transmission rod upper portion 670 is not pivoted in the right direction, the transmission rod lower portion 680 is not inserted into the plate 300. Therefore, even if the transmission rod 600 is pivoted in the shift direction, the plate 300 does not interwork with the transmission rod 600, and thus, is not pivoted in the shift direction. Accordingly, the shift direction pivoting of the transmission rod 600 is not restricted by the second moving member 220.

In this state, though the transmission rod 600 is pivoted in the shift direction or in the select direction, the detent pin elastic member 35 may allow the detent pin 30 to return to the first stable position "a" along the inclined surface formed around the first stable position "a".

When the predetermined condition is satisfied so as to change the shift position to the P-shift position in this state, the second fixing pin 210 of the second fixing part 200 moves to the second position as shown in FIG. 26. When the second fixing pin 210 of the second fixing part 200 moves to the second position, the rear side of the second fixing pin 210 becomes in contact with the second rear catching surface 351 of the plate recess 350. In this state, when the transmission rod upper portion 670 is pivoted in the right direction, the first fixing pin 110 of the first fixing part 100 moves to the fifth position as shown in FIG. 23. Also, when the transmission rod upper portion 670 is pivoted in the right direction, the transmission rod lower portion 680 is inserted into the plate 300 and the transmission rod 600 is pivoted in the shift direction. Therefore, since the plate 300 is, as shown in FIG. 26, pivoted in the shift direction in interworking with the transmission rod 600, the forward pivoting of the transmission rod lower portion 680, in other words, the rearward pivoting of the transmission rod upper portion 670 is restricted, and the forward pivoting of the transmission rod upper portion 670 is allowed, so that the shift position can be changed to the P-shift position.

Subsequently, as shown in FIG. 24, when the transmission rod upper portion 670 is pivoted forward, the plate 300 is pivoted rearward in interworking with the pivoting of the transmission rod upper portion 670, so that the second fixing pin 210 of the second fixing part 200 is placed at the third position. In the state where the second fixing pin 210 is located at the third position, when the predetermined condition is not satisfied, the second fixing pin 210 of the second fixing part 200 moves to the fourth position as shown in FIG. 27. When the second fixing pin 210 of the second fixing part 200 is located at the fourth position, the rear side of the second fixing pin 210 becomes in contact with the third rear catching surface 352. Since the plate 300, together with the transmission rod 600, is pivoted in the shift direction, the forward pivoting of the transmission rod lower portion 680, in other words, the rearward pivoting of the transmission rod upper portion 670 is restricted. Also, the detent pin 30 is placed at the second stable position "b" shown in FIG. 5. In this state, since the rearward pivoting of the transmission rod upper portion 670 is restricted by the second fixing pin 210 of the second fixing part 200 and the third rear catching surface 352 of the plate recess 350, the detent pin 30 is fixed to the second stable position "b". Accordingly, the vehicle shift control lever device 1 completes the change of the shift position to the P-shift position.

Subsequently, in order to change the P-shift position to another shift position, when the predetermined condition is satisfied, the second fixing pin 210 of the second fixing part 200 moves to the third position. When the second fixing pin 210 moves to the third position, the second fixing pin 210 does not contact the third rear catching surface 352 at the third position. Therefore, the transmission rod upper portion 670 can be pivoted rearward. When the transmission rod upper portion 670 is pivoted rearward, the plate 300 is pivoted forward in interworking with the pivoting of the transmission rod upper portion 670, and thus, the second fixing pin 210 of the second fixing part 200 is placed at the second position. When the second fixing pin 210 of the second fixing part 200 is located at the second position, the detent pin elastic member 35 allows the detent pin 30 to return to the first stable position "a" along the inclined surface formed on the groove member 40. As a result, the shift position can be changed from the P-shift position to another shift position even if the transmission rod upper portion 670 is not pivoted in the left direction.

Also, referring to FIG. 3, the vehicle shift control lever device 1 according to the embodiment may further include a release button 500.

One end of the release button 500 is disposed on the outer surface of the vehicle shift control lever device 1, and the other end of the release button 500 is disposed on the pressing portion 400. Here, when the end of the release button 500 is pressed downwardly, the release button 500 is moved downwardly, and the other end of the release button 500 is pivoted downwardly.

When it is not possible to determine whether the predetermined condition is satisfied or not due to the battery discharge of the vehicle or the occurrence of the problems of other electronic control units, the shift position may not be changed from the P-shift position to another shift position. In this case, even if the predetermined condition is not satisfied, the pressing portion 400 is mechanically pivoted downwardly by using the release button 500, so that the shift position can be changed from the P-shift position to another shift position.

FIG. 28 is a table which shows that the position of the first fixing pin 110 and the position of the second fixing pin 210 are determined at the P-shift position in accordance with the brake, the unlock button and whether driving or not, and shows whether the transmission rod 600 is pivotable or not in accordance with the pivoting direction thereof;

FIG. 29 is a table which shows that the position of the first fixing pin 110 and the position of the second fixing pin 210 are determined at the R-shift position in accordance with the brake, the unlock button and whether driving or not, and shows whether the transmission rod 600 is pivotable or not in accordance with the pivoting direction thereof;

FIGS. 30*a* and 30*b* are tables which shows that the position of the first fixing pin 110 and the position of the second fixing pin 210 are determined at the N-shift position in accordance with the brake, the unlock button and whether driving or not, and shows whether the transmission rod 600 is pivotable or not in accordance with the pivoting direction thereof;

FIG. 31 is a table which shows that the position of the first fixing pin 110 and the position of the second fixing pin 210 are determined at the D-shift position in accordance with the brake, the unlock button and whether driving or not, and shows whether the transmission rod 600 is pivotable or not in accordance with the pivoting direction thereof.

FIG. 32 is a table which shows that the position of the first fixing pin 110 and the position of the second fixing pin 210 are determined at the M-shift position in accordance with the brake, the unlock button and whether driving or not, and shows whether the transmission rod 600 is pivotable or not in accordance with the pivoting direction thereof.

Specifically, "∧" shown in FIGS. 28 to 32 means that the transmission rod upper portion 670 is pivoted one step forward.

"∧ ∧" means that the transmission rod upper portion 670 is pivoted two steps forward.

"∨" means that the transmission rod upper portion 670 is pivoted one step rearward.

"∨ ∨" means that the transmission rod upper portion 670 is pivoted two steps rearward.

"<" means that the transmission rod upper portion 670 is pivoted in the left direction.

">" means that the transmission rod upper portion 670 is pivoted in the right direction.

"> ∧" means that the transmission rod upper portion 670 is pivoted in the right direction and then is pivoted one step forward.

"∨ <" means that the transmission rod upper portion 670 is pivoted one step rearward and then is pivoted in the left direction.

"∨ < ∧" means that the transmission rod upper portion 670 is pivoted one step rearward and is pivoted in the left direction and then is pivoted one step forward.

"∨ < ∧ ∧" means that the transmission rod upper portion 670 is pivoted one step rearward and is pivoted in the left direction and then is pivoted two steps forward.

"∨ < ∨" means that the transmission rod upper portion 670 is pivoted one step rearward and is pivoted in the left direction and then is pivoted one step rearward.

"∨ <∨ ∨" means that the transmission rod upper portion 670 is pivoted is pivoted one step rearward and is pivoted in the left direction and then is pivoted two steps rearward.

"∨ < <" means that the transmission rod upper portion 670 is pivoted one step rearward and is pivoted in the left direction and then is pivoted one step in the left direction.

The vehicle shift control lever device 1 according to the embodiment of the present invention changes, as shown in FIGS. 28 to 32, the position of the first fixing pin 110 and the position of the second fixing pin 210 in accordance with the brake, the unlock button and whether driving or not in order to restrict the pivoting direction of the transmission rod 600 at each shift position.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A vehicle shift control lever device comprising:
    a transmission rod;
    a detent pin which is disposed under the transmission rod in such a manner as to move in up-and-down and back-and-forth directions; and
    a groove member which has a groove formed therein which guides the detent pin;
    wherein the groove member comprises a first stable position at which the detent pin is placed when a shift position is R, D, M or N-shift positions and a second stable position which is formed apart from the first stable position by a predetermined distance and at which the detent pin is placed when the shift position is a P-shift position wherein in each of the R, D, M, and N-shift positions, the detent pin is placed in the same first stable position of the groove member.

2. The vehicle shift control lever device of claim 1, wherein the transmission rod comprises a shift direction rotation axis and a selecting direction rotation axis, and wherein the vehicle shift control lever device further comprises a single sensor which detects a shift direction pivoting or select direction pivoting of the transmission rod.

3. The vehicle shift control lever device of claim 1, further comprising:
    a housing;
    a plate comprising a third rear catching surface; and
    a second fixing part disposed within the housing;
    wherein the second fixing part is caught by the third rear catching surface, so that the detent pin is placed at the second stable position.

4. The vehicle shift control lever device of claim 3, wherein the plate comprises a plate recess on which the third rear catching surface is formed;
    and wherein the second fixing part comprises a second fixing pin of which one end is inserted into the plate recess.

5. The vehicle shift control lever device of claim 4, further comprising: a pressing portion; and a release button, wherein, when a predetermined condition is satisfied or when the release button is pressed, the pressing portion moves the second fixing pin.

6. The vehicle shift control lever device of claim 5, wherein the predetermined condition is that brake and unlock buttons are in an on-state and a speed of the vehicle is a safe shift possible speed.

7. The vehicle shift control lever device of claim 5, wherein, after the transmission rod upper portion is pivoted forward in a state where the transmission rod upper portion of the transmission rod has been pivoted in the right direction, when the predetermined condition is not satisfied, the second fixing pin is caught by the third rear catching surface, so that the detent pin is placed at the second stable position.

8. The vehicle shift control lever device of claim 7, wherein the predetermined condition is that brake and unlock buttons are in an on-state and a speed of the vehicle is a safe shift possible speed.

9. The vehicle shift control lever device of claim 1, further comprising a display which displays a current shift position.

10. The vehicle shift control lever device of claim 1, wherein the second stable position is formed apart from the first stable position in a select direction and in a shift direction.

11. A vehicle shift control lever device comprising:
    a transmission rod having a distal end and a proximal end;
    a detent pin attached to the distal end of the transmission rod; and
    a groove member which has a groove formed therein, the detent pin elastically biased into contact with the groove;
    wherein the groove member comprises a first stable position and a second stable position, the detent pin engaging the first stable position of the groove when a shift position is a combination of R, D, M or N shift positions, and the detent pin engaging the second stable position of the groove when the shift position is a P shift position wherein in each of the R, D, M, and N-shift positions, the detent pin is placed in the same first stable position of the groove member.

* * * * *